United States Patent
Park et al.

(10) Patent No.: US 11,153,905 B2
(45) Date of Patent: Oct. 19, 2021

(54) METHOD FOR SUPPORTING FULL DUPLEX RADIO (FDR) OPERATION IN WIRELESS COMMUNICATION SYSTEM AND APPARATUS THEREFOR

(71) Applicant: LG ELECTRONICS INC., Seoul (KR)

(72) Inventors: Jonghyun Park, Seoul (KR); Suckchel Yang, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 710 days.

(21) Appl. No.: 15/772,791

(22) PCT Filed: Oct. 31, 2016

(86) PCT No.: PCT/KR2016/012378
§ 371 (c)(1),
(2) Date: May 1, 2018

(87) PCT Pub. No.: WO2017/074155
PCT Pub. Date: May 4, 2017

(65) Prior Publication Data
US 2020/0170038 A1  May 28, 2020

Related U.S. Application Data

(60) Provisional application No. 62/249,343, filed on Nov. 1, 2015.

(51) Int. Cl.
*H04W 74/08* (2009.01)
*H04W 8/24* (2009.01)
(Continued)

(52) U.S. Cl.
CPC ......... *H04W 74/0808* (2013.01); *H04W 8/24* (2013.01); *H04W 16/14* (2013.01);
(Continued)

(58) Field of Classification Search
CPC ......... H04L 27/26; H04L 5/14; H04L 5/0035; H04L 5/0048; H04L 5/001; H04L 5/0026;
(Continued)

(56) References Cited

U.S. PATENT DOCUMENTS

| 2015/0256305 A1 | 9/2015 | Yerramalli et al. |
| 2016/0165529 A1* | 6/2016 | Jin ................ H04W 36/0085 |
| | | 370/338 |

(Continued)

FOREIGN PATENT DOCUMENTS

| WO | 2014/189915 A2 | 11/2014 |
| WO | 2014/200951 A2 | 12/2014 |
| WO | 2015/057367 A1 | 4/2015 |

OTHER PUBLICATIONS

Samsung, "Discussion on Self-deferral Procedure for LBT Cat. 4", R1-154140, 3GPP TSG RAN WG1 #82, Beijing, China, Aug. 24-28, 2015, See section 2.

Primary Examiner — Mandish K Randhawa
(74) Attorney, Agent, or Firm — Dentons US LLP

(57) ABSTRACT

According to one embodiment of the present invention a method for transmitting and receiving a wireless signal of a base station in a wireless communication system, comprises the steps of: performing a first CCA for an unlicensed band; transmitting an UL grant for PUSCH transmission of a first user equipment when the idle state of the unlicensed band, resulting from the first CCA performance, is detected; and receiving the PUSCH from the first user equipment through the unlicensed band at a preset point of time after transmitting the UL grant, and simultaneously transmitting a DL grant for PDSCH transmission to a second user equipment.

12 Claims, 12 Drawing Sheets

(51) Int. Cl.
  *H04W 16/14*  (2009.01)
  *H04W 28/26*  (2009.01)
  *H04W 72/04*  (2009.01)
  *H04W 72/14*  (2009.01)

(52) U.S. Cl.
  CPC ......... *H04W 28/26* (2013.01); *H04W 72/042* (2013.01); *H04W 72/14* (2013.01)

(58) Field of Classification Search
  CPC ............. H04L 27/2636; H04L 27/2602; H04L 5/0082; H04L 5/0091; H04L 27/0006; H04L 5/0044; H04W 74/0808; H04W 72/14; H04W 72/042; H04W 16/14; H04W 8/24; H04W 28/26; H04J 11/0053; H04B 7/0617
  See application file for complete search history.

(56) References Cited

U.S. PATENT DOCUMENTS

| | | | |
|---|---|---|---|
| 2016/0174206 A1* | 6/2016 | Xia | H04B 7/0417 370/329 |
| 2016/0302226 A1* | 10/2016 | Kim | H04W 72/1289 |
| 2017/0033916 A1* | 2/2017 | Stirling-Gallacher | H04L 5/14 |

\* cited by examiner

[Fig. 1]
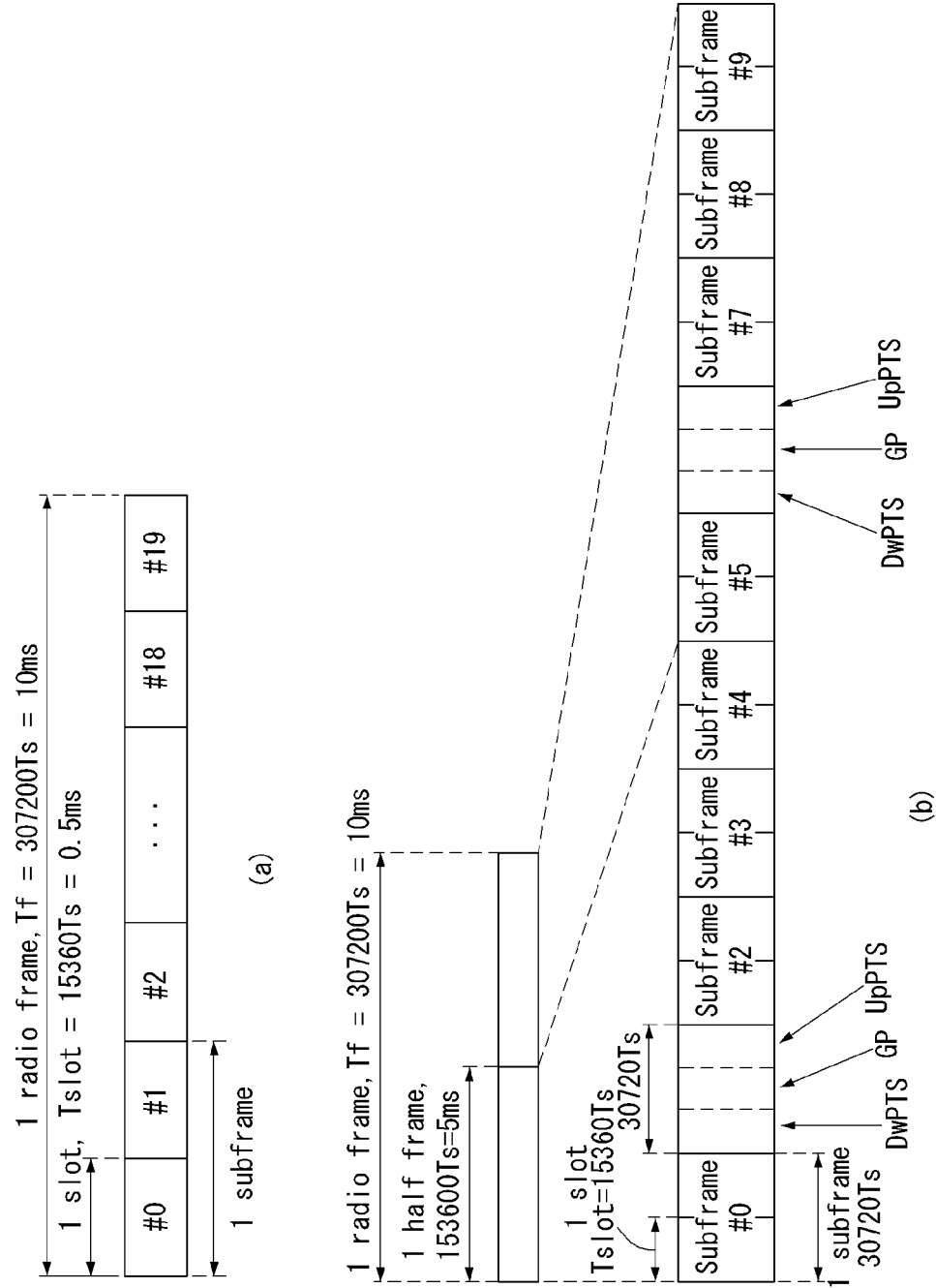

[Fig. 2]
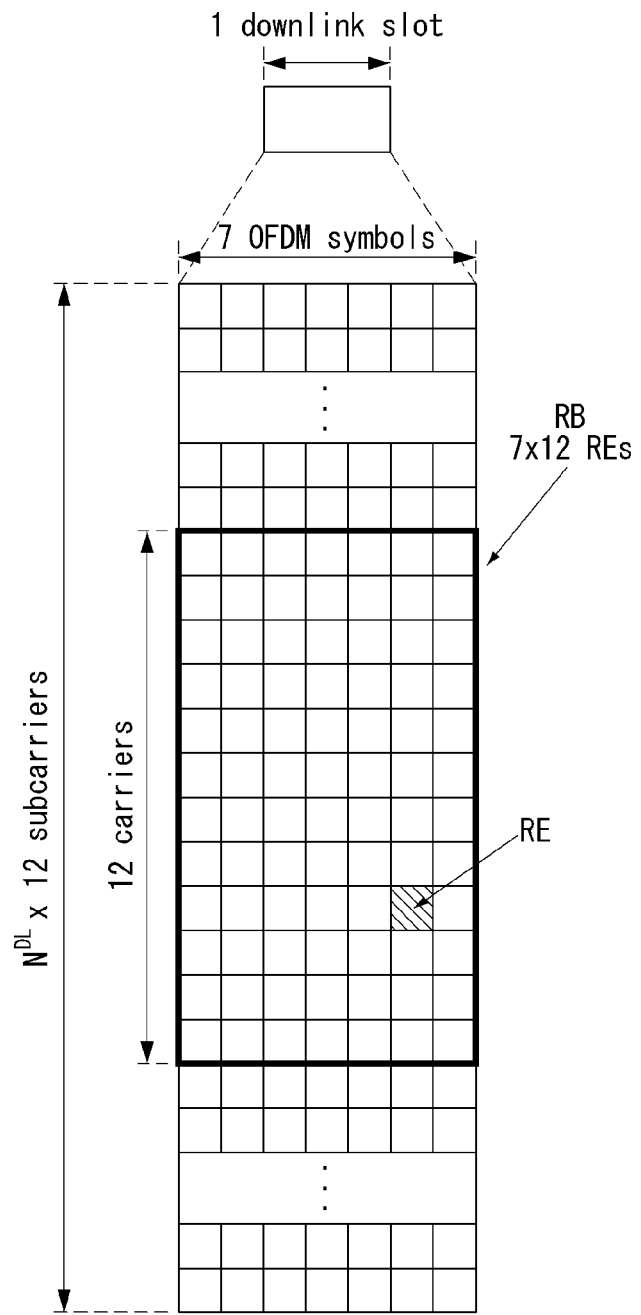

[Fig. 3]
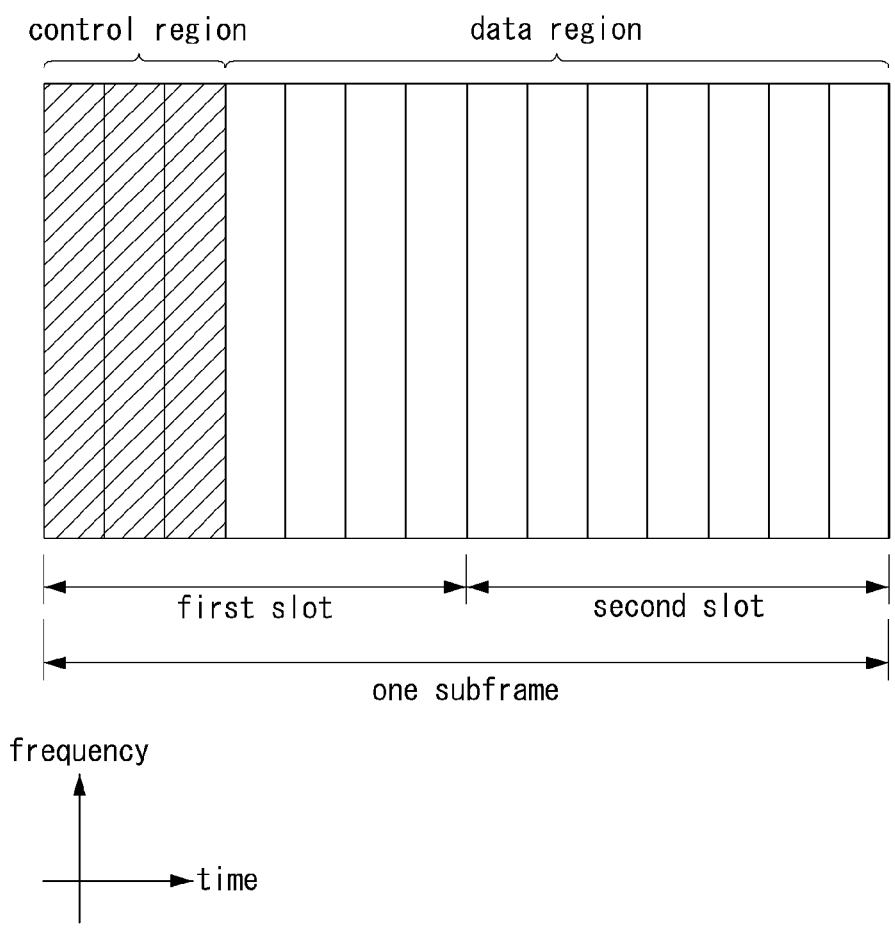

[Fig. 4]
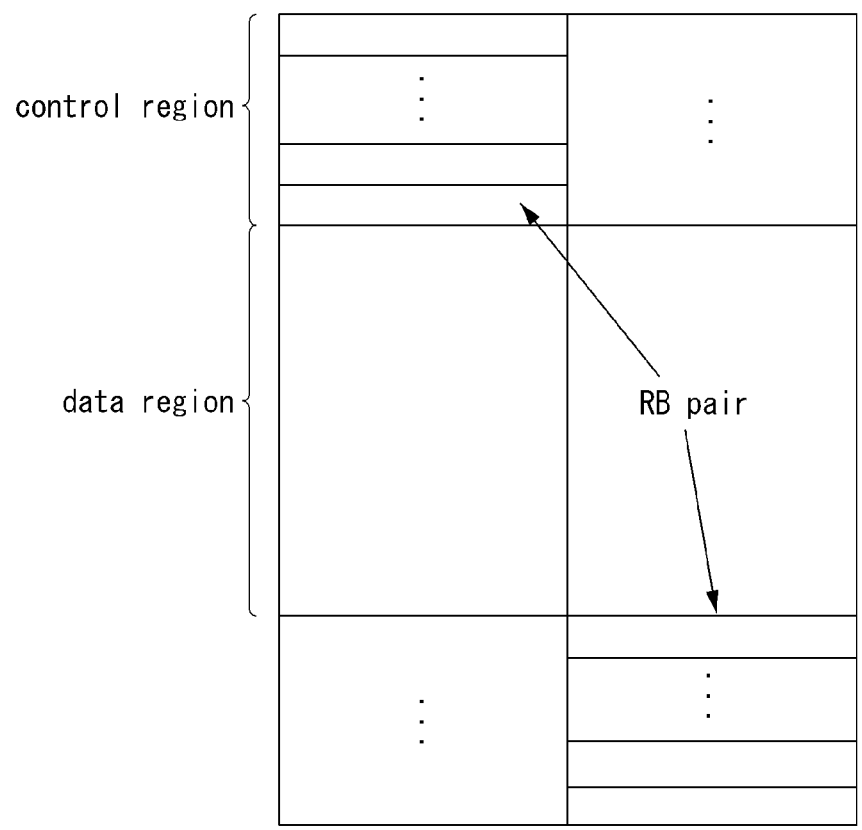

[Fig. 5]
(a) 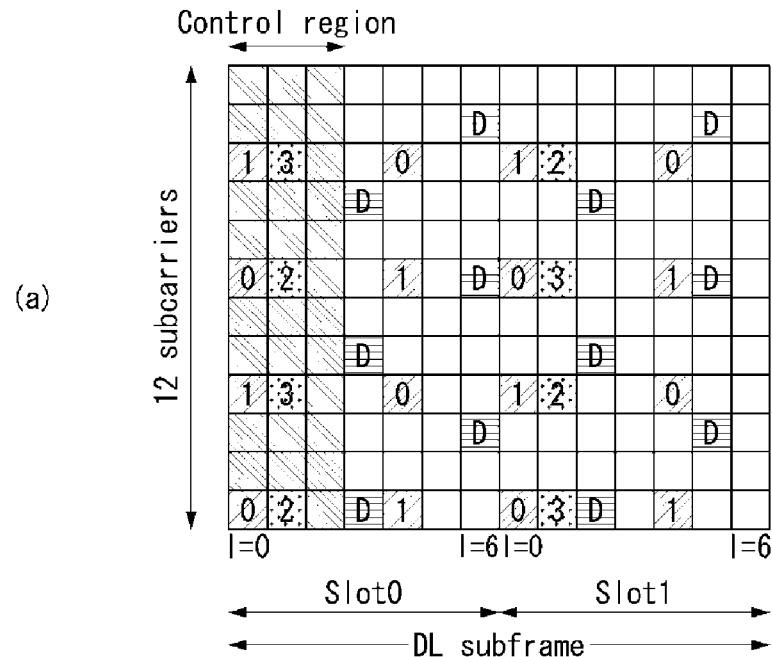
(b) 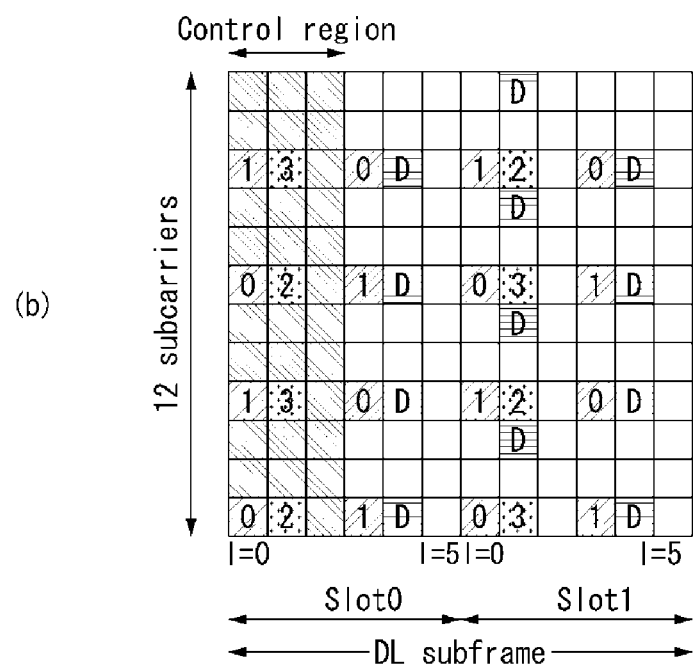

[Fig. 6]
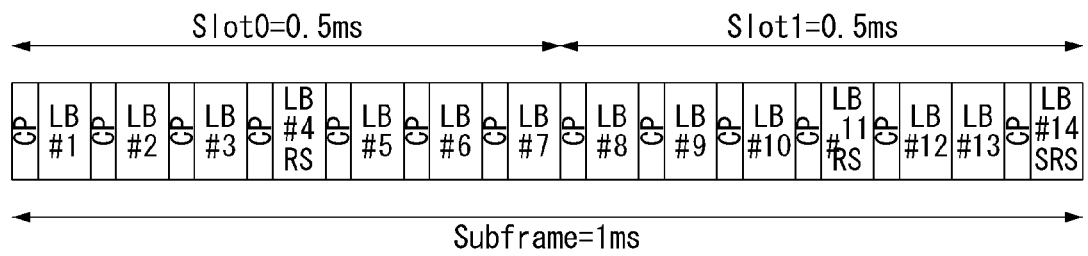

[Fig. 7]
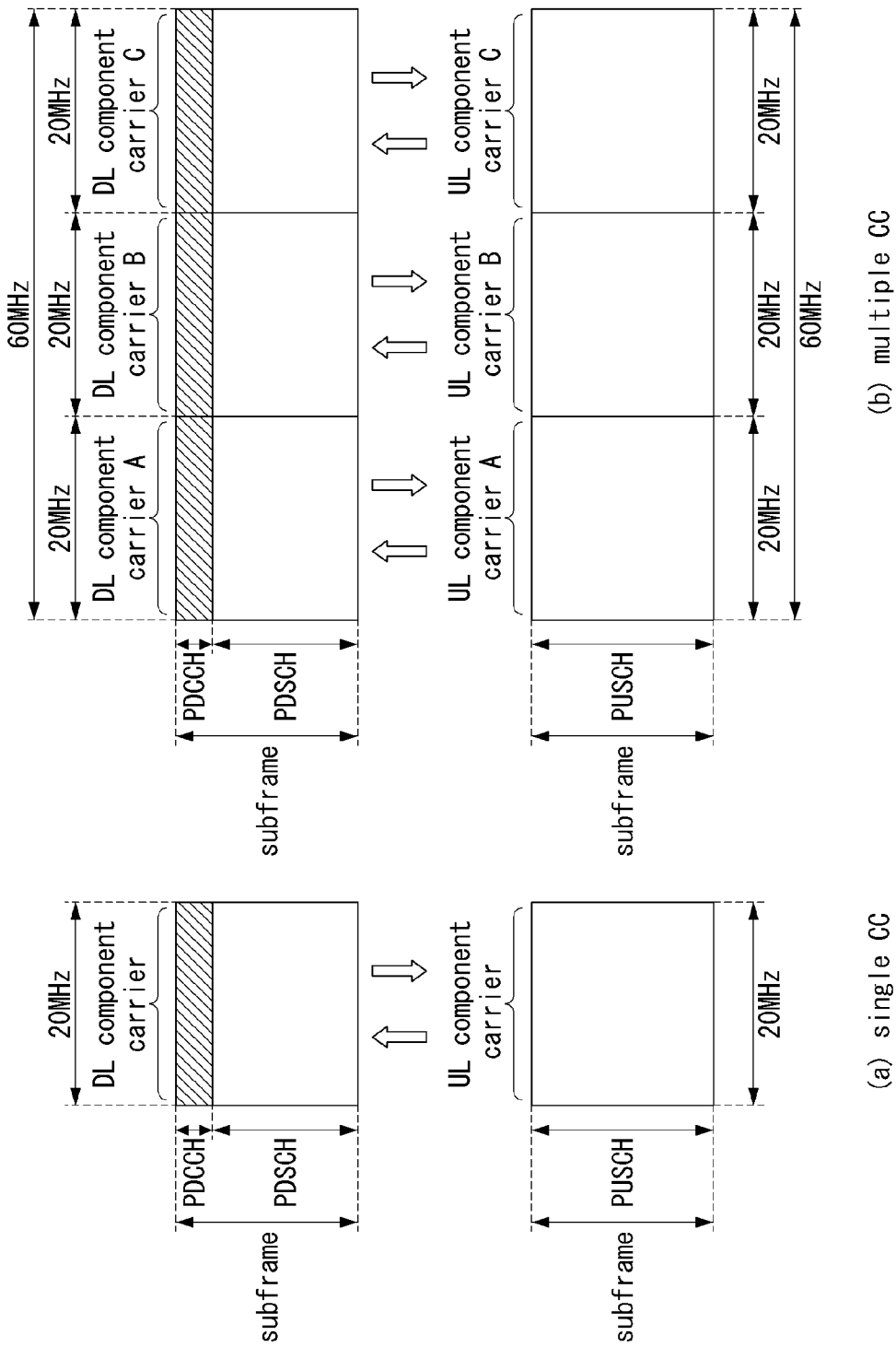

【Fig. 8】
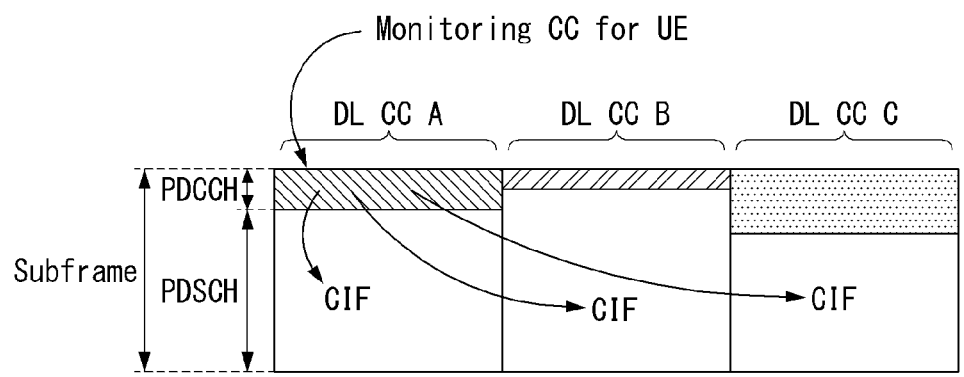
【Fig. 9】
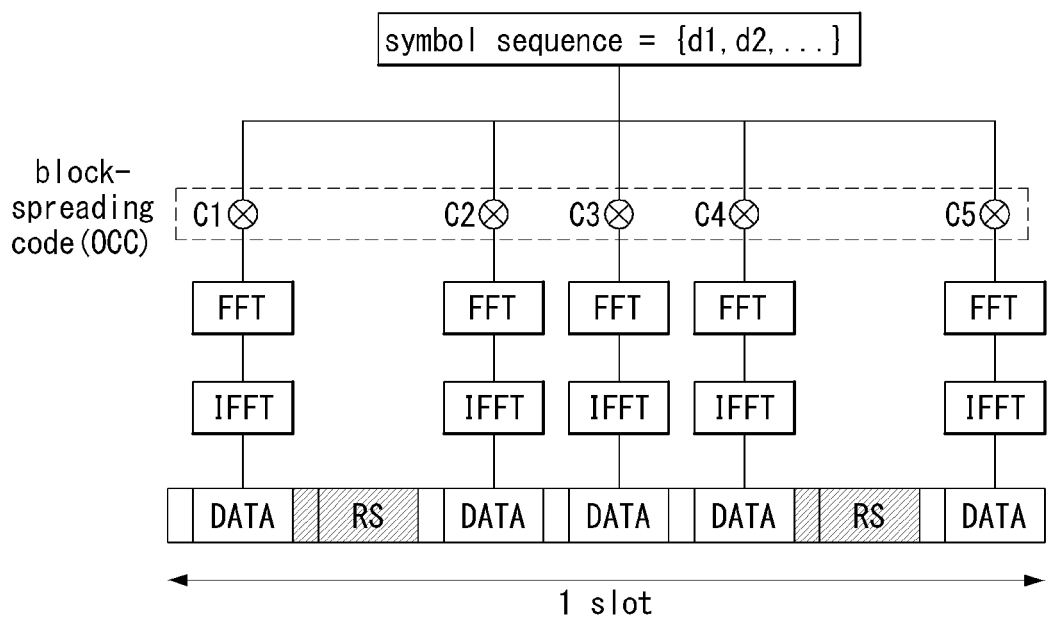

[Fig. 10]
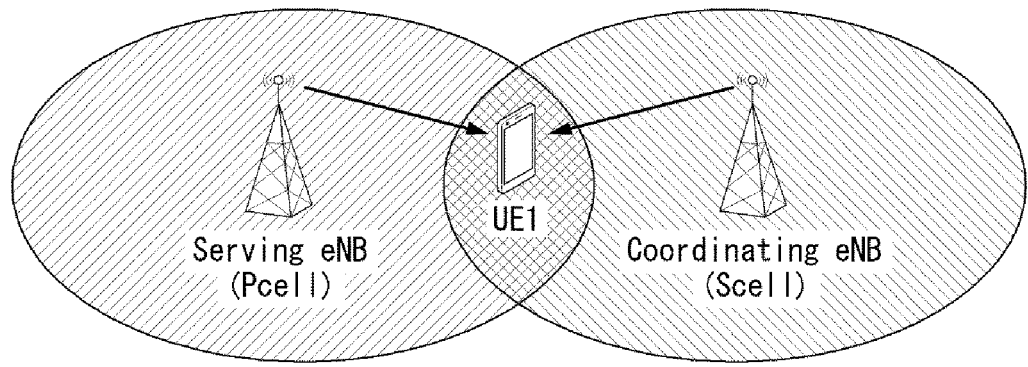
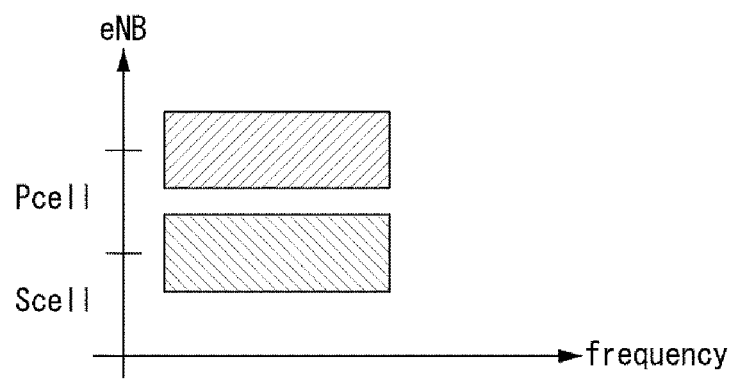
[Fig. 11]
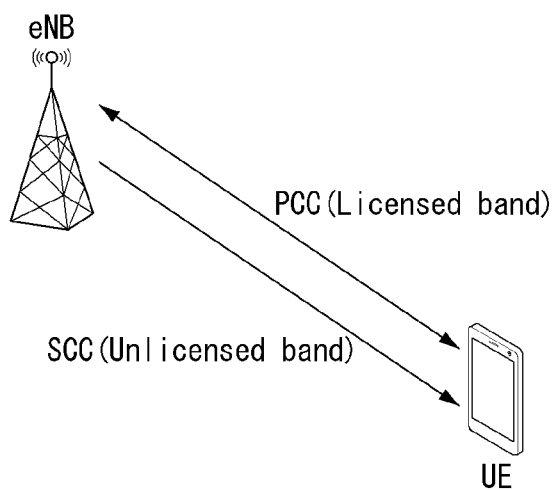

【Fig. 12】
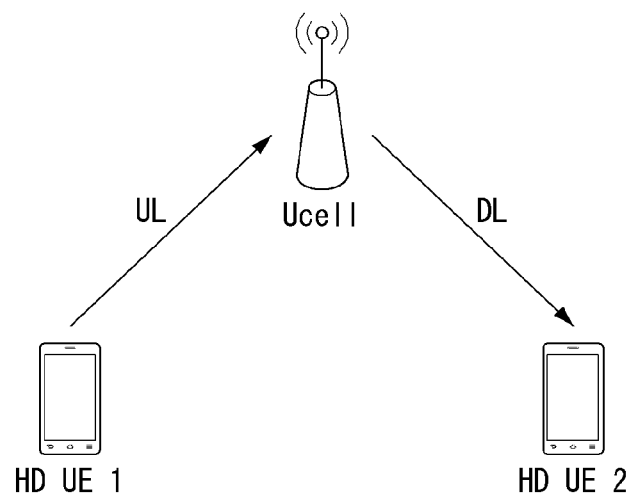
Asynchronous dual link
【Fig. 13】
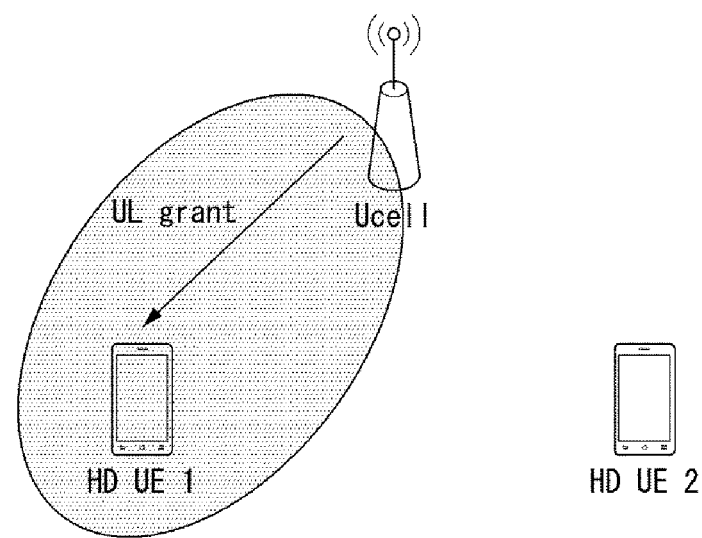
Asynchronous dual link

[Fig. 14]
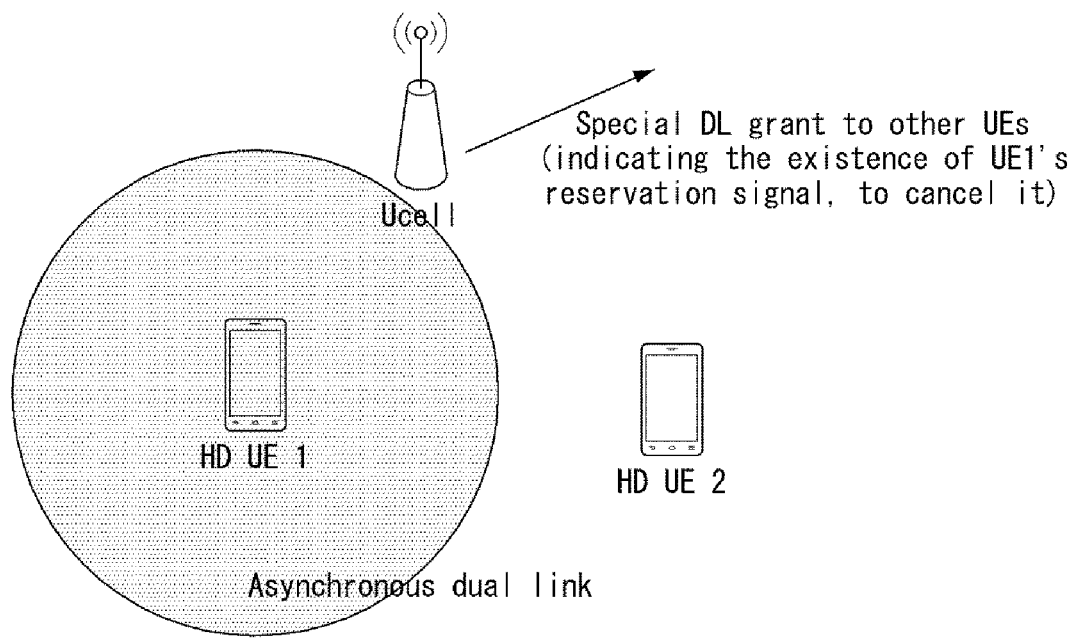
[Fig. 15]
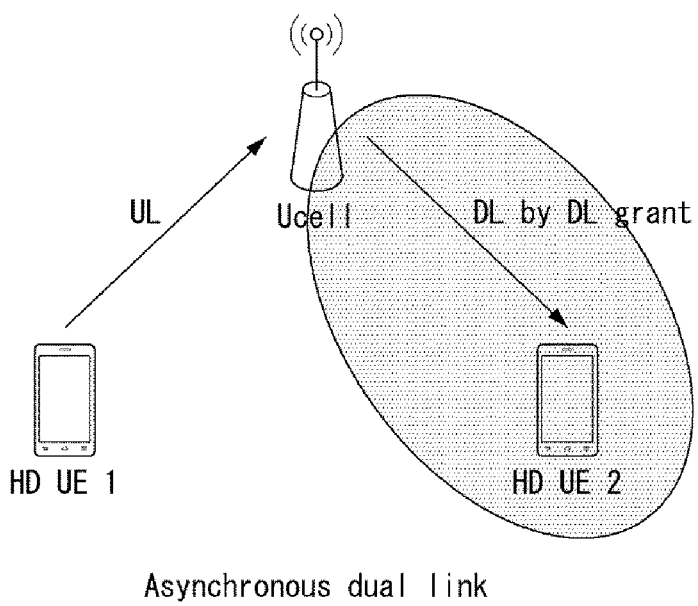
Asynchronous dual link

[Fig. 16]
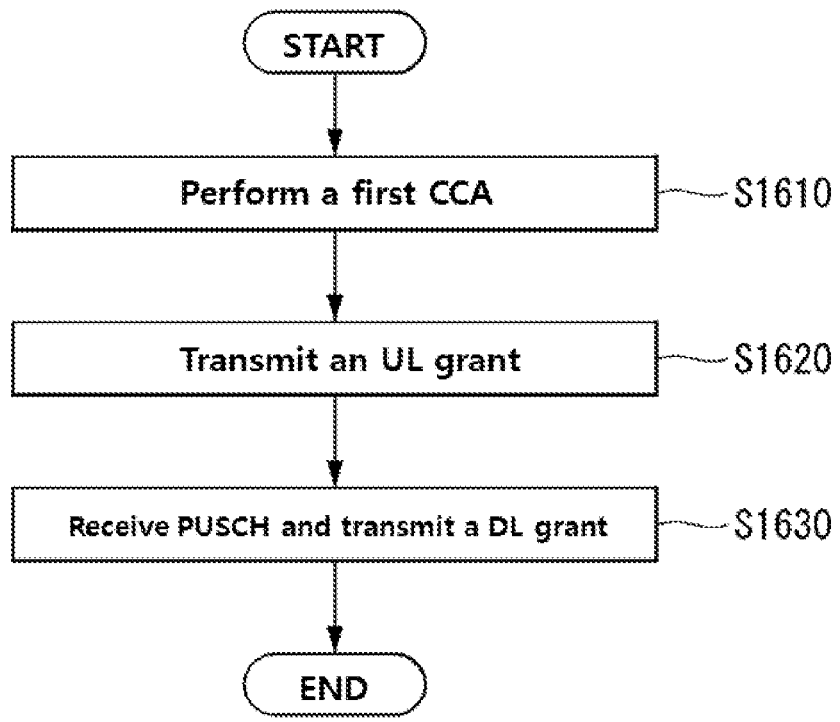
[Fig. 17]
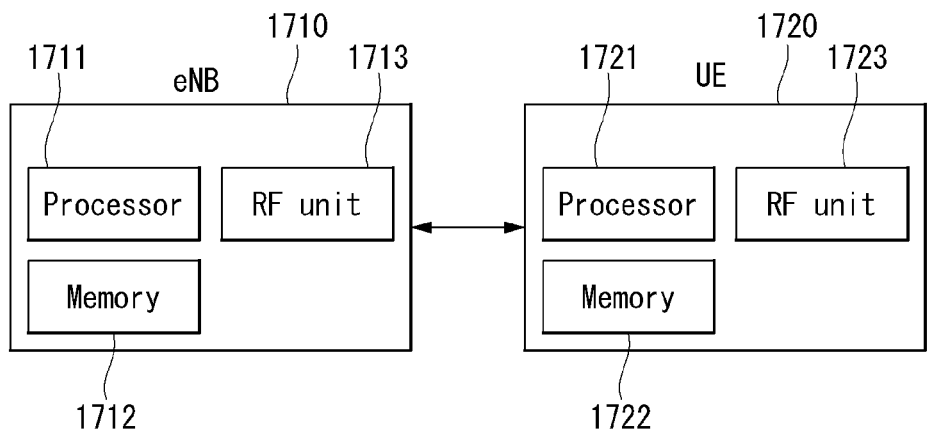

METHOD FOR SUPPORTING FULL DUPLEX RADIO (FDR) OPERATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2016/012378, filed on Oct. 31, 2016, which claims the benefit of U.S. Provisional Applications No. 62/249,343, filed on Nov. 1, 2015, the contents of which are all hereby incorporated by reference herein in their entirety.

TECHNICAL FIELD

The present invention relates to a wireless communication system and, more particularly, to a method for supporting a full duplex radio (FDR) operation in a wireless communication system and an apparatus performing the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An aspect of the present invention provides a signal transmission/reception operation of an eNB and/or a UE to which a full duplex radio (FDR) system is introduced, in a situation in which signal transmission/reception is performed through a carrier of an unlicensed band in which dedicated use of a specific system is not guaranteed.

Technical tasks obtainable from the present invention are not limited to the above-mentioned technical task and any other unmentioned technical tasks may be clearly understood from the following description by those having ordinary skill in the art.

Technical Solution

According to an aspect of the present invention, there is provided a method for transmitting and receiving a wireless signal of a base station in a wireless communication system, including: performing a first clear channel assessment (CCA) regarding an unlicensed band; transmitting, when an idle state of the unlicensed band is detected as a result of performing the first CCA, an uplink (UL) grant for transmission of a physical uplink shared channel (PUSCH) of a first user equipment (UE); and receiving the PUSCH from the first UE through the unlicensed band at a preset time after transmission of the UL grant and simultaneously transmitting a downlink (DL) grant for transmission of a physical downlink shared channel (PDSCH) to a second UE.

Also, the first UE may be a UE transmitting a first reservation signal for occupying the unlicensed band up to the preset time, after receiving the UL grant.

Also, the method may further include: receiving capability information of the first UE including transmission capability information of the first reservation signal of the first UE.

Also, the method may further include: transmitting, to the first UE, control information indicating whether to activate transmission capability of the first reservation signal of the first UE.

Also, the first CCA may be a directive CCA regarding the first UE.

Also, the method may further include: performing a second CCA regarding the unlicensed band before transmitting the DL grant, and wherein the second CCA is a directive CCA regarding the second UE.

Also, the first and the second UEs may be paired in advance on the basis of a direction to the BS.

Also, the method may further include: transmitting, to another UE, a DL grant including information indicating whether to transmit the first reservation signal of the first UE.

Also, the method may further include: transmitting, to another UE, a parameter required for detecting the first reservation signal of the first UE.

Also, the first reservation signal of the first UE may be detected and removed by other UEs on the basis of the parameter.

Also, the method may further include: when a third reservation signal of a third UE, which is not paired with the first UE, is expected to be simultaneously transmitted with the first reservation signal as the UL grant regarding the third UE is transmitted before the preset time, providing configuration information regarding the third reservation signal to the third UE so that the third reservation signal can be transmitted in a state of maintaining orthogonality with respect to the first reservation signal.

Also, the method may further include: when a third reservation signal of a third UE, which is not paired with the first UE, is anticipated to be simultaneously transmitted with the first reservation signal as the UL grant regarding the third UE is transmitted before the preset time, providing configuration information regarding the third reservation signal to the third UE so that the third reservation signal can be combined with the first reservation signal and transmitted.

Also, when the UL grant is received through an n-th system frame (SF), the preset time may correspond to a transmission time of (n+4)-th SF.

According to another aspect of the present invention, there is provided a base station of a wireless communication system, including: a radio frequency (RF) unit configured to transmit and receive a wireless signal; and a processor configured to control the RF unit, wherein the base station is configured to: perform a first clear channel assessment (CCA) regarding an unlicensed band, transmit an uplink (UL) grant for transmission of a physical uplink shared channel (PUSCH) of a first user equipment (UE) when an idle state of the unlicensed band is detected as a result of performing the first CCA, and receivee the PUSCH from the first UE through the unlicensed band at a preset time after transmission of the UL grant and simultaneously transmit a downlink (DL) grant for transmission of a physical downlink shared channel (PDSCH) to a second UE.

Also, the first UE may be a UE transmitting a first reservation signal for occupying the unlicensed band up to the preset time, after receiving the UL grant.

Advantageous Effects

According to an embodiment of the present invention, a stable FDR operation may be performed in a wireless communication system, so that a limited frequency band may be effectively utilized.

Also, according to an embodiment of the present invention, since a UE scheduled to transmit a PUSCH transmits a reservation signal up to a PUSCH transmission time to occupy an unlicensed band, PUSCH transmission of the corresponding UE may be stably guaranteed.

It will be appreciated by persons skilled in the art that that the effects that could be achieved with the present invention are not limited to what has been particularly described hereinabove and other advantages of the present invention will be more clearly understood by a person skilled in the art to which the present invention pertains, from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 shows the structure of a radio frame in a wireless communication system to which an embodiment of the present invention may be applied.

FIG. 2 is a diagram illustrating a resource grid for one downlink slot in a wireless communication system to which an embodiment of the present invention may be applied.

FIG. 3 shows the structure of a downlink subframe in a wireless communication system to which an embodiment of the present invention may be applied.

FIG. 4 shows the structure of an uplink subframe in a wireless communication system to which an embodiment of the present invention may be applied.

FIG. 5 shows patterns of reference signals mapped to pairs of downlink resource blocks in a wireless communication system to which an embodiment of the present invention may be applied.

FIG. 6 shows an uplink subframe including sounding reference signal symbols in a wireless communication system to which an embodiment of the present invention may be applied.

FIG. 7 shows an example of component carriers and carrier aggregation in a wireless communication system to which an embodiment of the present invention may be applied.

FIG. 8 shows an example of a structure of a subframe according to cross-carrier scheduling in a wireless communication system to which an embodiment of the present invention may be applied.

FIG. 9 shows one example of generating and transmitting 5 SC-FDMA symbols during one slot in the wireless communication system to which the present invention may be applied FIG. 10 shows a carrier aggregation-based CoMP system in a wireless communication system to which an embodiment of the present invention may be applied.

FIG. 11 illustrates an eNB and a UE that transmit and receive signals in a licensed band and an unlicensed band according to an embodiment of the present invention.

FIG. 12 is a diagram illustrating an asynchronous dual link situation according to an embodiment of the present invention.

FIG. 13 is a diagram illustrating operations of UE1 and eNB at a transmission time point of # n SF according to an embodiment of the present invention.

FIG. 14 is a diagram illustrating operations of UE1 and eNB at transmission time points of # n+1 to 3 SFs according to an embodiment of the present invention.

FIG. 15 is a diagram illustrating operations of UE1 and eNB at a transmission time point of # n+4 SF according to an embodiment of the present invention.

FIG. 16 is a flowchart illustrating a method of supporting FDR by an eNB according to an embodiment of the present invention.

FIG. 17 shows a block configuration of a wireless communication apparatus according to an embodiment of the present invention.

BEST MODES

Some embodiments of the present invention are described in detail with reference to the accompanying drawings. A detailed description to be disclosed along with the accompanying drawings are intended to describe some exemplary embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this disclosure, a base station (BS) (or eNB) has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

FIG. 1(a) illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

In the frame structure type 2 of a TDD system, an uplink-downlink configuration is a rule indicating whether uplink and downlink are allocated (or reserved) to all subframes. Table 1 shows the uplink-downlink configuration.

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 6 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" is indicative of a subframe for downlink transmission, "U" is indicative of a subframe for uplink transmission, and "S" is indicative of a special subframe including three types of a DwPTS, GP, and UpPTS. An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 below shows a configuration (length of DwPTS/GP/UpPTS) of a special subframe.

TABLE

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio frame is only one example. The number of subcarriers included in a radio frame or the number of slots included in a subframe and the number of OFDM symbols included in a slot may be changed in various ways.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NDL included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Reference Signal (RS)

In a wireless communication system, data is transmitted via a wireless channel, and thus, a signal may be distorted during transmission. In order for a receiving end to accurately receive, distortion of the received signal should be corrected using channel information. In order to detect channel information, a method of transmitting a signal known to both a transmitting side and the receiving side and a method of detecting channel information using a degree of distortion when a signal is transmitted through a channel are largely used. The afore-mentioned signal is called a pilot signal or a reference signal (RS).

Also, recently, most mobile communication systems uses a method for enhancing transmission/reception data efficiency by adopting multiple transmit antennas and multiple receive antennas in order to transmit a packet, moving away from the conventional use of a single transmit antenna and a single receive antenna. When data is transmitted or received using multiple input/output antennas, a channel state between the transmit antennas and the receive antennas should be detected to accurately receive a signal. Therefore, each transmit antenna should have a separate reference signal.

In a mobile communication system, an RS may be classified into two types according to its purpose. There are an RS for acquiring channel information and an RS used for data demodulation. The former aims at acquiring channel information by a UE to downlink, and thus, the former RS should be transmitted in a broadband, and even a UE, which does not receive downlink data in a specific subframe, should receive and measure the RS. Also, the former RS is used for measurement such as handover, or the like. The latter RS is an RS transmitted together in a corresponding resource when a base station (BS) transmits it to downlink. Upon receiving the corresponding RS, the UE may be able to perform channel estimation, and thus, demodulate data. The latter RS should be transmitted in a region in which data is transmitted.

Five types of downlink RS are defined as follows.
CRS: cell-specific reference signal
MBSFN RS: multicast-broadcast single-frequency network reference signal
UE-specific RS or demodulation RS (DM-RS)
PRS: positioning reference signal
CSI-RS: channel state information reference signal
One RS is transmitted for each downlink antenna port.

The CRS is transmitted in every downlink subframe within a cell supporting PDSCH transmission. The CRS is transmitted in one or more of antenna ports 0 to 3. The CRS is defined only in $\Delta f=15$ kHz.

The MBSFN RS is transmitted in an MBSFN region of an MBSFN subframe only when a physical multicast channel (PMCH) is transmitted. The MBSFN RS is transmitted in antenna port 4. The MBSFN RS is defined only in an extended CP.

The DM-RS is supported for transmission of a PDSCH and is transmitted in antenna ports p=5, p=7, p=8 or p=7, 8, . . . , u+6. Here, u is the number of layers used for transmission of the PDSCH. The DM-RS is present and valid for PDSCH demodulation only when PDSCH transmission is associated in a corresponding antenna port. The DM-RS is transmitted only in a resource block (RB) to which the corresponding PDSCH is mapped.

Regardless of the antenna port p, when any one of a physical channel and a physical signal other than the DM-RS is transmitted using an RE of the same index pair (k,l) in which the DM-RS is transmitted, the DM-RS is not transmitted in the RE of the corresponding index pair (k,l).

The PRS is transmitted only in a resource block within a downlink subframe set for PRS transmission.

When both a general subframe and an MBSFN subframe are set as positioning subframes within one cell, OFDM symbols within the MBSFN subframe set for PRS transmission use the same CP as that of subframe #0. When only the MBSFN subframe is set as a positioning subframe within one cell, OMDM symbols set for the PRS within the MBSFN region of the corresponding subframe use an extended CP.

Within the subframe set for PRS transmission, a starting point of an OFDM symbol set for PRS transmission is the same as a starting point of a subframe having the same CP length as that of every OFDM symbol set for the RPS transmission.

The PRS is transmitted in antenna port 6.

The PRS is not mapped to an RE (k,l) allocated to a physical broadcast channel (PBCH), a PSS, or SSS, regardless of the antenna port p.

The PRS is defined only in $\Delta f=15$ kHz.

The CSI-RS is transmitted in 1, 2, 4, or 8 number of antenna ports using p=15, p=15, 16, p=15, . . . , 18, and p=15, . . . , 22, respectively.

The CSI-RS is defined only in $\Delta f=15$ kHz.

The reference signal (RS) will be described in more detail.

The CRS is an RS for obtaining information regarding a state of a channel shared by every terminal within a cell and measuring handover, or the like. The DM-RS is used for data demodulation only for a specific UE. Information for demodulation and channel measurement may be provided using such reference signals. That is, the DM-RS is used only for data demodulation, and the CRS is used for both purposes of channel information obtaining and data demodulation.

The receiving side (i.e., UE) measures a channel state from the CRS, and feeds back an indicator related to channel quality such as a CQI (Channel Quality Indicator), a PMI (Precoding Matrix Index), a PTI (Precoding Type Indicator) and/or an RI (Rank Indicator) to the transmitting side (i.e., Base Station). Meanwhile, a reference signal related to feedback of channel state information (CSI) may be defined as a CSI-RS.

The DM-RS may be transmitted through resource elements when data on a PDSCH is required to be demodulated. The UE may receive whether a DM-RS is present through a higher layer, and may be valid only when the corresponding PDSCH is mapped. The DM-RS may be called a UE-specific RS or a demodulation RS (DMRS).

FIG. 5 illustrates a reference signal pattern mapped to a downlink resource block pair in a wireless communication system to which an embodiment of the present invention may be applied.

Referring to FIG. 5, a downlink resource block pair, that is, a unit in which a reference signal is mapped unit, may be represented in the form of one subframe in a time domain X 12 subcarriers in a frequency domain. That is, in a time axis (i.e., x axis), one resource block pair has a length of 14 OFDM symbols in the case of a normal Cyclic Prefix (CP) (FIG. 10(*a*)) and has a length of 12 OFDM symbols in the case of an extended CP (FIG. 10(b)). In the resource block lattice, Resource Elements (REs) indicated by "0", "1", "2", and "3" mean the positions of the CRSs of antenna port indices "0", "1", "2", and "3", and REs indicated by "D" denotes the position of a DRS.

A CRS is described in detail below. The CRS is used to estimate the channel of a physical antenna and is a reference signal which may be received by all UEs located in a cell in common. The CRS is distributed to the entire frequency bandwidth. Furthermore, the CRS may be used for Channel Quality Information (CQI) and data demodulation.

The CRS is defined in various formats depending on an antenna array on the transmission side (i.e., an eNB). In a 3GPP LTE system (e.g., release-8), various antenna arrays are supported, and the transmission side of a downlink signal has three types of antenna arrays, such as 3 single transmission antennas, 2 transmission antennas, and 4 transmission antennas. If an eNB uses a single transmission antenna, reference signals for a single antenna port are arrayed. If an eNB uses 2 transmission antennas, reference signals for 2 transmission antenna ports are arrayed using a Time Division Multiplexing (TDM) method and/or a Frequency Division Multiplexing (FDM) method. That is, different time resources and/or different frequency resources are allocated so that reference signals for 2 antenna ports are distinguished from each other.

Furthermore, if an eNB uses 4 transmission antennas, reference signals for 4 transmission antenna ports are arrayed using the TDM and/or FDM methods. Channel information measured by the reception side (i.e., UE) of a downlink signal may be used to demodulate data transmitted using a transmission method, such as single transmission antenna transmission, transmission diversity, closed-loop spatial multiplexing, open-loop spatial multiplexing, or an multi-User-multi-input/output (MIMO) antennas.

If a multi-input/output antenna is supported, when a reference signal is transmitted by a specific antenna port, the reference signal is transmitted in the positions of resource elements specified depending on the pattern of the reference signal and is not transmitted in the positions of resource elements specified for other antenna ports. That is, reference signals between different antennas do not overlap.

Sounding Reference Signal (SRS)

An SRS is mostly used in the measurement of channel quality in order to perform uplink frequency-selective scheduling and is not related to the transmission of uplink data and/or control information, but the present invention is not limited thereto. The SRS may be used for various other purposes for improving power control or various startup functions of UEs which have not been recently scheduled. The startup functions may include an initial Modulation and Coding Scheme (MCS), initial power control for data transmission, a timing advance, and frequency semi-selective scheduling, for example. In this case, the frequency semi-selective scheduling means selectively allocating a frequency resource to the first slot of a subframe and pseudo-randomly hopping to another frequency in the second slot of the subframe and allocating frequency resources.

Furthermore, the SRS may be used to measure downlink channel quality, assuming that a radio channel is reciprocal between uplink and downlink. Such an assumption is particularly valid when the same frequency spectrum is shared between uplink and downlink and in Time Division Duplex (TDD) systems separated in a time domain.

The subframes of an SRS transmitted by UE within a cell may be represented by a cell-specific broadcasting signal. A 4-bit cell-specific parameter "srsSubframeConfiguration" indicates 15 available subframe arrays in which an SRS may be transmitted though respective radio frames. In accordance with such arrays, the flexibility of control of SRS overhead may be provided according to a deployment scenario.

A sixteenth array completely turns off the switch of an SRS within a cell, which is mostly suitable for a serving cell which provides service to high-speed UEs.

FIG. 6 illustrates an uplink subframe including the symbols of a Sounding Reference Signal (SRS) in a wireless communication system to which an embodiment of the present invention may be applied.

Referring to FIG. 6, an SRS is always transmitted through the last SC-FDMA symbol in an arrayed subframe. Accordingly, an SRS and DMRS are placed in different SC-FDMA symbols.

The transmission of PUSCH data is not permitted in a specific SC-FDMA symbol for SRS transmission. As a result, if sounding overhead is the highest, that is, although an SRS symbol is included in all subframes, sounding overhead does not exceed about 7%.

Each SRS symbol is generated based on a base sequence (i.e., a random sequence or a sequence set based on Zadoff-Ch (ZC)) regarding a given time unit and frequency bandwidth. All UEs within the same cell use the same base sequence. In this case, the transmissions of SRSs from a plurality of UEs within the same cell in the same frequency bandwidth and the same time are orthogonal to each other by different cyclic shifts of a base sequence and are distinguished from each other.

SRS sequences from different cells may be distinguished from each other because different base sequences are allocated to respective cells, but orthogonality between the different base sequences is not guaranteed.

General Carrier Aggregation

A communication environment taken into consideration in embodiments of the present invention includes a multi-carrier support environment. That is, a multi-carrier system or Carrier Aggregation (CA) system that is used in an embodiment of the present invention refers to a system in which one or more Component Carriers (CCs) having a smaller bandwidth than a target bandwidth are aggregated and used when the target wideband is configured in order to support a wideband.

In an embodiment of the present invention, a multi-carrier means of an aggregation of carriers (or a carrier aggregation). In this case, an aggregation of carriers means both an aggregation between contiguous carriers and an aggregation between discontiguous (or non-contiguous) carriers. Furthermore, the number of CCs aggregated between downlink and uplink may be different. A case where the number of downlink CCs (hereinafter called "DL CCs") and the number of uplink CCs (hereinafter called "UL CCs") are the same is called a symmetric aggregation. A case where the number of DL CCs is different from the number of UL CCs is called an asymmetric aggregation. Such the term of a carrier aggregation may be replaced with terms, such as a carrier aggregation, bandwidth aggregation, or spectrum aggregation.

An object of a carrier aggregation configured by aggregating two or more component carriers is to support up to a 100 MHz bandwidth in an LTE-A system. When one or more carriers having a smaller bandwidth than a target bandwidth are aggregated, the bandwidth of the aggregated carriers may be restricted to a bandwidth which is used in an existing system in order to maintain backward compatibility with an existing IMT system. For example, in an existing 3GPP LTE system, {1.4, 3, 5, 10, 15, 20} MHz bandwidths may be supported. In a 3GPP LTE-advanced system (i.e., LTE-A), bandwidths greater than the bandwidth 20 MHz may be supported using only the bandwidths for a backward compatibility with existing systems. Furthermore, in a carrier aggregation system used in an embodiment of the present invention, new bandwidths may be defined regardless of the bandwidths used in the existing systems in order to support a carrier aggregation.

An LTE-A system uses the concept of a cell in order to manage radio resources.

The aforementioned carrier aggregation environment may also be called a multi-cell environment. A cell is defined as a combination of a pair of a downlink resource (DL CC) and an uplink resource (UL CC), but an uplink resource is not an essential element. Accordingly, a cell may consist of a downlink resource only or a downlink resource and an uplink resource. If specific UE has a single configured serving cell, it may have 1 DL CC and 1 UL CC. If specific UE has two or more configured serving cells, it has DL CCs corresponding to the number of cells, and the number of UL CCs may be the same as or smaller than the number of DL CCs.

In some embodiments, a DL CC and an UL CC may be configured in an opposite way. That is, if specific UE has a plurality of configured serving cells, a carrier aggregation environment in which the number of UL CCs is greater than the number of DL CCs may also be supported. That is, a carrier aggregation may be understood as being an aggregation of two or more cells having different carrier frequency (the center frequency of a cell). In this case, the "cell" should be distinguished from a "cell", that is, a region commonly covered by an eNB.

A cell used in an LTE-A system includes a Primary Cell (PCell) and a Secondary Cell (SCell). A PCell and an SCell may be used as serving cells. In the case of UE which is in an RRC_CONNECTED state, but in which a carrier aggregation has not been configured or which does not support a carrier aggregation, only one serving cell configured as only a PCell is present. In contrast, in the case of UE which is in the RRC_CONNECTED state and in which a carrier aggregation has been configured, one or more serving cells may be present. A PCell and one or more SCells are included in each serving cell.

A serving cell (PCell and SCell) may be configured through an RRC parameter. PhysCellId is the physical layer identifier of a cell and has an integer value from 0 to 503. SCellIndex is a short identifier which is used to identify an SCell and has an integer value of 1 to 7. ServCellIndex is a short identifier which is used to identify a serving cell (PCell or SCell) and has an integer value of 0 to 7. The value 0 is applied to a PCell, and SCellIndex is previously assigned in order to apply it to an SCell. That is, in ServCellIndex, a cell having the smallest cell ID (or cell index) becomes a PCell.

A PCell means a cell operating on a primary frequency (or primary CC). A PCell may be used for UE to perform an initial connection establishment process or a connection re-establishment process and may refer to a cell indicated in a handover process. Furthermore, a PCell means a cell that belongs to serving cells configured in a carrier aggregation environment and that becomes the center of control-related communication. That is, UE may receive a PUCCH allocated only in its PCell and send the PUCCH and may use only the PCell to obtain system information or to change a monitoring procedure. An Evolved Universal Terrestrial Radio Access Network (E-UTRAN) may change only a PCell for a handover procedure using the RRC connection reconfiguration (RRCConnectionReconfiguration) message of a higher layer including mobility control information (mobilityControlInfo) for UE which supports a carrier aggregation environment.

An SCell may mean a cell operating on a secondary frequency (or secondary CC). Only one PCell is allocated to specific UE, and one or more SCells may be allocated to the specific UE. An SCell may be configured after RRC connection is established and may be used to provide additional radio resources. A PUCCH is not present in the remaining cells, that is, SCells that belong to serving cells configured in a carrier aggregation environment and that do not include a PCell. When adding an SCell to UE supporting a carrier aggregation environment, an E-UTRAN may provide all types of system information related to the operation of a related cell in the RRC_CONNECTED state through a dedicated signal. A change of system information may be controlled by releasing and adding a related SCell. In this case, the RRC connection reconfiguration (RRCConnection-Reconfigutaion) message of a higher layer may be used. An E-UTRAN may send dedicated signaling having a different parameter for each UE instead of broadcasting within a related SCell.

After an initial security activation process is started, an E-UTRAN may configure a network including one or more SCells by adding to a PCell that is initially configured in a connection establishing process. In a carrier aggregation environment, a PCell and an SCell may operate respective component carriers. In the following embodiments, a Primary Component Carrier (PCC) may be used as the same meaning as a PCell, and a Secondary Component Carrier (SCC) may be used as the same meaning as an SCell.

FIG. 7 shows an example of component carriers and carrier aggregation in a wireless communication system to which an embodiment of the present invention may be applied.

(a) of FIG. 7 illustrates a single carrier structure used in an LTE system. Component carriers include a DL CC and a UL CC. One CC may have a frequency range of 20 MHz.

(b) of FIG. 7 illustrates a carrier aggregation structure used in an LTE_A system. (b) of FIG. 7 illustrates a case in which three CCs having a frequency size of 20 MHz are combined. Three DL CCs and three UL CCs are provided, but there is no limitation in the number of DL CCs and UL CCs. In the case of carrier aggregation, the UE may simultaneously monitor three CCs, receive downlink signal/data, and transmit uplink signal/data.

If N DL CCs are managed in a specific cell, a network may allocate M (MEN) DL CCs to UE. In this case, the UE may monitor only the M limited DL CCs and receive a DL signal. Furthermore, a network may give priority to L (L≤M≤N) DL CCs and allocate major DL CCs to UE. In this case, the UE must monitor the L DL CCs. Such a method may be applied to uplink transmission in the same manner.

A linkage between a carrier frequency (or DL CC) of a downlink resource and a carrier frequency (or UL CC) of an uplink resource may be indicated by a higher layer message, such as an RRC message, or system information. For example, a combination of DL resources and UL resources may be configured by a linkage defined by System Information Block Type2 (SIB2). Specifically, the linkage may mean a mapping relationship between a DL CC in which a PDCCH carrying an UL grant is transmitted and an UL CC in which the UL grant is used and may mean a mapping relationship between a DL CC (or UL CC) in which data for an HARQ is transmitted and an UL CC (or DL CC) in which an HARQ ACK/NACK signal is transmitted.

Cross-Carrier Scheduling

In a carrier aggregation system, there are two methods, that is, a self-scheduling method and a cross-carrier scheduling method form the point of view of scheduling for a carrier or a serving cell. Cross-carrier scheduling may also be called cross-component carrier scheduling or cross-cell scheduling.

Cross-carrier scheduling means that a PDCCH (DL grant) and a PDSCH are transmitted in different DL CCs or that a PUSCH transmitted according to a PDCCH (UL grant) transmitted in a DL CC is transmitted through an UL CC different from an UL CC that is linked to the DL CC through which the UL grant has been received.

Whether cross-carrier scheduling will be performed may be activated or deactivate in a UE-specific way, and each UE may be notified through high layer signaling (e.g., RRC signaling) semi-statically.

If cross-carrier scheduling is activated, there is a need for a Carrier Indicator Field (CIF) providing notification that a PDSCH/PUSCH indicated by a PDCCH is transmitted through which DL/UL CC. For example, a PDCCH may allocate a PDSCH resource or PUSCH resource to any one of a plurality of component carriers using a CIF. That is, if a PDCCH on a DL CC allocates a PDSCH or PUSCH resource to one of multi-aggregated DL/UL CCs, a CIF is configured. In this case, a DCI format of LTE-A Release-8 may be extended according to the CIF. In this case, the configured CIF may be fixed to a 3-bit field, and the position of the configured CIF may be fixed regardless of the size of the DCI format. Furthermore, a PDCCH structure (resource mapping based on the same coding and the same CCE) of LTE-A Release-8 may be reused.

In contrast, if a PDCCH on a DL CC allocates a PDSCH resource on the same DL CC or allocates a PUSCH resource on a single-linked UL CC, a CIF is not configured. In this case, the same PDCCH structure (resource mapping based on the same coding and the same CCE) and DCI format as those of LTE-A Release-8 may be used.

If cross-carrier scheduling is possible, UE needs to monitor a PDCCH for a plurality of pieces of DCI in the control region of a monitoring CC based on a transmission mode and/or bandwidth corresponding to each CC. Accordingly, there is a need for the configuration of a search space and PDCCH monitoring capable of supporting such monitoring.

In a carrier aggregation system, a UE DL CC set is indicative of a set of DL CCs scheduled so that UE receives a PDSCH. A UE UL CC set is indicative of a set of UL CCs scheduled so that UE transmits a PUSCH. Furthermore, a PDCCH monitoring set is indicative of a set of one or more DL CCs for performing PDCCH monitoring. A PDCCH monitoring set may be the same as a UE DL CC set or may be a subset of a UE DL CC set. A PDCCH monitoring set may include at least one of DL CCs within a UE DL CC set. Alternatively, a PDCCH monitoring set may be separately defined regardless of a UE DL CC set. DL CCs included in a PDCCH monitoring set may be configured so that self-scheduling for a linked UL CC is always possible. Such a UE DL CC set, UE UL CC set, and PDCCH monitoring set may be configured in a UE-specifically, UE group-specifically, or cell-specifically.

If cross-carrier scheduling is deactivated, it means that a PDCCH monitoring set is always the same as UE DL CC set. In this case, there is no indication, such as separate signaling for a PDCCH monitoring set. However, if cross-carrier scheduling is activated, a PDCCH monitoring set may be defined in a UE DL CC set. That is, in order to schedule a PDSCH or PUSCH for UE, an eNB transmits a PDCCH through a PDCCH monitoring set only.

FIG. 8 shows an example of a structure of a subframe according to cross-carrier scheduling in a wireless communication system to which an embodiment of the present invention may be applied.

Referring to FIG. 8, in a DL subframe for an LTE-A UE, three DL CCs are combined and DL CC 'A' indicates a case set with a PDCCH monitoring DL CC. In case where a CIF is not used, each DL CC may transmit a PDCCH scheduling a PDSCH thereof without a CIF. Meanwhile, in case where the CIF is used through higher layer signaling, only one DL CC 'A' may transmit the PDCCH scheduling a PDSCH thereof or a PDSCH of another CC using the CIF. Here, DL CC 'B' and 'C' not set as PDCCH monitoring DL CCs do not transmit the PDCCH.

PDCCH Transmission

The eNB determines a PDCCH format according to a DCI to be transmitted to the UE, and attaches a CRC (Cyclic Redundancy Check) to control information. A unique identifier (which is called an RNTI (Radio Network Temporary Identifier)) is masked to the CRC according to an owner of the PDCCH or a purpose thereof. In the case of a PDCCH for a specific UE, a unique identifier of a UE, e.g., a C-RNTI (Cell-RNTI), may be masked to the CRC. Or, in the case of a PDCCH for a paging message, a paging indication identifier, e.g., a P-RNTI (Paging-RNTI) may be masked to the CRC. In the case of a PDCCH for system information, specifically, a system information block (SIB), a system information identifier or an SI-RNTI (system information RNTI) may be masked to the CRC. In order to indicate a random access response, a response with respect to transmission of a random access preamble of a UE, an RA-RNTI (random access-RNTI) may be masked to the CRC.

Thereafter, the BS performs channel coding on CRC-added control information to generate coded data. Here, the BS may perform channel coding at a code rate according to an MCS level. The BS may perform rate matching according to a CCE aggregation level allocated to a PDCCH format, and modulates the coded data to generate modulated symbols. Here, a modulation order according to the MCS level may be used. A CCE aggregation level of modulated symbols forming one PDCCH may be one of 1, 2, 4 and 8. Thereafter, the BS maps the modulated symbols to physical resource elements (CCE to RE mapping).

A plurality of PDCCHs may be transmitted in one subframe. That is, a control region of one subframe includes a plurality of CCEs having an index $0 \sim N\_(CCE,k)-1$. Here, N(CCE, k) denotes a total number of CCE s within a control region of a kth subframe. The UE monitors a plurality of PDCCHs in each subframe.

Here, monitoring refers to UE attempting to decode PDCCHs according to a monitored PDCCH format. In a control region allocated within a subframe, the BS does not provide information regarding where a corresponding PDCCH is present. In order to receive a control channel transmitted from the BS, the UE searches for a PDCCH thereof by monitoring an aggregation of PDCCH candidates within a subframe because the UE does not know in which position, at which CCE aggregation level, or in which DCI format, the PDCCH thereof is transmitted. This is called blind decoding/detection (BD). Blind decoding refers to a method by which the UE de-masks a UE ID thereof in a CRC portion and checks a CRC error to determine whether a corresponding PDCCH is a control channel of the UE.

In the active mode, the UE monitors a PDCCH of each subframe to receive data transmitted to the UE. In a DRX mode, the UE wakes up in a monitoring section of each DRX period to monitor a PDCCH in a subframe corresponding to a monitoring section. A subframe in which PDCCH is monitored is called a non-DRX subframe.

In order to receive the PDCCH transmitted to the UE, the UE should perform blind decoding on all CCEs present in the control region of the non-DRX subframe. Since the UE does not know which PDCCH format will be transmitted, the UE should decode all PDCCHs at a possible CCE aggregation level until the blind decoding of the PDCCH is successful in every non-DRX subframe. Since the UE does not know how many CCEs the PDCCH for itself uses, the UE should attempt detection at all possible CCE aggregation levels until the blind decoding of the PDCCH is successful. That is, the UE performs blind decoding by each CCE aggregation level. That is, the UE first attempts at decoding at a CCE aggregation level unit by 1. If decoding fails, the UE attempts at decoding at the CCE aggregate level unit by 2. Thereafter, the UE attempts at decoding the CCE aggregation level unit by 4 and the CCE aggregation level unit by 8 again. Also, the UE attempts at blind decoding on all four C-RNTI, P-RNTI, SI-RNTI and RA-RNTI. In addition, the UE attempts at blind decoding on all DCI formats to be monitored.

In this manner, if the UE attempts at blind decoding by every CCE aggregation level for all DCI formats to be monitored for all possible RNTIs, the number of detection attempts will be excessively increase, and thus, in the LTE system, a search space (SS) concept is defined for blind decoding of the UE. Search space refers to a PDCCH candidate set for monitoring, and may have a different size according to each PDCCH format.

The search space may include a common search space (CSS) and a UE-specific/dedicated search space (USS). In the case of the common search space, all terminals may know a size of the common search space, but the UE-specific search space may be set individually for each terminal. Accordingly, the UE should monitor both the UE-specific search space and the common search space in order to decode the PDCCH, and thus, the UE performs blind decoding (BD) at a maximum of 44 times in one sub-frame. Here, blind decoding performed in accordance with different CRC values (e.g., C-RNTI, P-RNTI, SI-RNTI, RA-RNTI) is not included.

Due to the small search space, it may happen that eNB fails to secure the CCE resources for transmitting the PDCCH to all the UEs to which the PDCCH is to be transmitted within a given subframe. This is because resources remaining after the CCE location are allocated may not be included in the search space of the specific UE. In order to minimize such barriers that may continue in a next sub-frame, a UE-specific hopping sequence may be applied to a starting point of the UE-specific search space.

Table 3 shows a size of the common search space, and a size of the UE-specific search space.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

In order to alleviate the computational load of the UE according to the number of attempts at blind decoding, the UE does not simultaneously perform search according to all defined DCI formats. In detail, the UE may always perform search for DCI format 0 and 1A in the UE-specific search space. Here, DCI formats 0 and 1A have the same size, but the UE may differentiate between the DCI format using a flag (for format 0/format 1A differentiation) used for differentiating between DCI formats 0 and 1A included in the PDCCH. Also, according to the PDSCH transmission mode set by the eNB, a DCI format other than the DCI formats 0 and 1A may be required for the terminal. For example, there are DCI formats 1, 1B, and 2.

In the common search space, the UE may search the DCI formats 1A and 1C. Also, the UE may be configured to search for DCI format 3 or 3A, and DCI formats 3 and 3A have the same size as DCI formats 0 and 1A, but the UE may differentiate the DCI formats using the CRC scrambled by an identifier other than a UE-specific identifier.

A search space $S\_k^{(L)}$ refers to a PDCCH candidate set according to an aggregation level $L \in \{1,2,4,8\}$ ACCE according to a PDCCH candidate set m of a search space may be determined by Equation 4 below.

$$L \cdot \{(Y_k+m) \bmod \lfloor N_{CCE,k}/L \rfloor\}+i \qquad \text{[Equation 1]}$$

Here, M_(L) denotes the number of PDCCH candidates according to a CCE aggregation level L for monitoring, and m=0~M^(L)−1. i denotes an index designating an individual CCE in each PDCCH candidate, and i=0~L−1.

As described above, the UE monitors both the UE-specific search space and the common search space to decode the PDCCH. Here, the common search space (CSS) supports PDCCHs having an aggregation level $\{4, 8\}$, and the UE-specific search space (USS) supports PDCCHs having an aggregation level $\{1, 2, 4, 8\}$ Table 4 shows PDCCH candidates monitored by the UE.

TABLE 4

| | Search space $S_k^{(L)}$ | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Equation 1, in the case of the CSS, $Y_k$ is set to 0 for two aggregation levels L=4 and L=8. Meanwhile, in the case of the UE-specific SS (USS), $Y_k$ is defined as expressed by Equation 5 for an aggregation level L.

$$Y_k = (A \cdot Y_{k-1}) \bmod D \qquad \text{[Equation 2]}$$

Here, $Y_{-1} = n_{RNTI} \neq 0$, and an RNTI value used for $n_{RNTI}$ may be defined as one of identifiers of the UE. Also, A=39827, D=65537, and k=$\lfloor n_s/2 \rfloor$. Here, n_s denotes a slot number (or index) in a radio frame.

Block Spreading Technique

The block spreading technique is a scheme that modulates transmission of the control signal by using the SC-FDMA scheme unlike the existing PUCCH format 1 series or 2 series. As illustrated in FIG. 11, a symbol sequence may be spread and transmitted on the time domain by using an orthogonal cover code (OCC). The control signals of the plurality of terminals may be multiplexed on the same RB by using the OCC. In the case of PUCCH format 2 described above, one symbol sequence is transmitted throughout the time domain and the control signals of the plurality of terminals are multiplexed by using the cyclic shift (CS) of the CAZAC sequence, while in the case of a block spreading based on PUCCH format (for example, PUCCH format 3), one symbol sequence is transmitted throughout the frequency domain and the control signals of the plurality of terminals are multiplexed by using the time domain spreading using the OCC.

FIG. 9 illustrates one example of generating and transmitting 5 SC-FDMA symbols during one slot in the wireless communication system to which the present invention may be applied.

In FIG. 9, an example of generating and transmitting 5 SC-FDMA symbols (that is, data part) by using an OCC having the length of 5 (alternatively, SF=5) in one symbol sequence during one slot. In this case, two RS symbols may be used during one slot.

In the example of FIG. 9, the RS symbol may be generated from a CAZAC sequence to which a specific cyclic shift value is applied and transmitted in a type in which a predetermined OCC is applied (alternatively, multiplied) throughout a plurality of RS symbols. Further, in the example of FIG. 8, when it is assumed that 12 modulated symbols are used for each OFDM symbol (alternatively, SC-FDMA symbol) and the respective modulated symbols are generated by QPSK, the maximum bit number which may be transmitted in one slot becomes 24 bits (=12×2). Accordingly, the bit number which is transmittable by two slots becomes a total of 48 bits. When a PUCCH channel structure of the block spreading scheme is used, control information having an extended size may be transmitted as compared with the existing PUCCH format 1 series and 2 series.

CA-Based CoMP Operation

In system subsequent to LTE, cooperative multi-point (CoMP) transmission may be implemented using a carrier aggregation (CA) function in LTE.

FIG. 10 is a diagram illustrating a carrier aggregation-based CoMP system in a wireless communication system to which an embodiment of the present invention may be applied.

FIG. 10 illustrates that a primary cell (PCell) carrier and a secondary cell (SCell) carrier use the same frequency band on a frequency axis and are respectively allocated to two eNBs that are geographically spaced apart from each other. A serving eNB allocates a PCell to UE1, and an neighboring eNB providing much interference allocates an SCell, so that Various DL/UL CoMP operations such as JT, CS/CB, and dynamic cell selection may be performed.

FIG. 10 shows an example in which UE aggregates two eNBs as a PCell and an SCell, respectively. Practically, UE may aggregate three or more cells, and a CoMP operation on some of the three cells in the same frequency band may be performed and a simple CA operation on other cells in a different frequency band may be performed. In this case, the PCell does not need to take part in the CoMP operation.

UE Procedure for Receiving PDSCH

When UE detects a PDCCH of a serving cell on which a DCI format 1, 1A, 1B, 1C, 1D, 2, 2A, 2B or 2C intended for the UE is carried other than a subframe(s) indicated by a higher layer parameter "mbsfn-SubframeConfigList", the UE decodes a corresponding PDSCH in the same subframe with the restriction of the number of transport blocks defined in a higher layer.

UE decodes a PDSCH according to a detected PDCCH with CRC scrambled by an SI-RNTI or P-RNTI on which a DCI format 1A, 1C intended for the UE is carried, and assumes that a PRS is not present in a resource block (RB) on which the corresponding PDSCH is carried.

UE in which a carrier indicator field (CIF) for a serving cell is configured assumes that a CIF is not present in any PDCCH of a serving cell within a common search space.

Otherwise, when PDCCH CRC is scrambled by a C-RNTI or an SPS C-RNTI, UE in which a CIF is configured assumes that a CIF for a serving cell is present in a PDCCH that is located within a UE-specific search space.

When UE is configured by a higher layer so that it decodes a PDCCH with CRC scrambled by an SI-RNTI, the UE decodes the PDCCH and a corresponding PDSCH according to a combination defined in Table 3 below. The PDSCH corresponding to the PDCCH(s) is scrambling-initialized by the SI-RNTI.

Table 5 illustrates a PDCCH and PDSCH configured by an SI-RNTI.

TABLE 5

| DCI FORMAT | SEARCH SPACE | METHOD FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

If UE is configured by a higher layer so that it decodes a PDCCH with CRC scrambled by a P-RNTI, the UE decodes the PDCCH and a corresponding PDSCH according to a combination defined in Table 4 below. The PDSCH corresponding to the PDCCH(s) is scrambling-initialized by the P-RNTI.

Table 6 illustrates a PDCCH and PDSCH configured by a P-RNTI.

TABLE 6

| DCI FORMAT | SEARCH SPACE | METHOD FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

If UE is configured by a higher layer so that it decodes a PDCCH with CRC scrambled by an RA-RNTI, the UE decodes the PDCCH and a corresponding PDSCH according to a combination defined in Table 5 below. The PDSCH corresponding to the PDCCH(s) is scrambling-initialized by the RA-RNTI.

Table 7 illustrates a PDCCH and PDSCH configured by an RA-RNTI.

TABLE 7

| DCI FORMAT | SEARCH SPACE | METHOD FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |

TABLE 7-continued

| DCI FORMAT | SEARCH SPACE | METHOD FOR SENDING PDSCH CORRESPONDING TO PDCCH |
|---|---|---|
| DCI format 1A | common | If the number of PBCH antenna ports is 1, a single antenna port, a port 0 is used, and if not, transmit diversity |

UE may be semi-statically configured through higher layer signaling so that it receives PDSCH data transmission signaled through a PDCCH in accordance with any one of 9 transmission modes, including a mode 1 to a mode 9.

In the case of the frame structure type 1,
- UE does not receive a PDSCH RB transmitted in the antenna port 5 even in any subframe in which the number of OFDM symbols for a PDCCH having a common CP is 4.
- If any one of 2 physical resource blocks (PRBs) to which a virtual resource block (VRB) pair is mapped overlaps a frequency in which a PBCH or a primary or secondary synchronous signal is transmitted within the same subframe, UE does not receive a PDSCH RB transmitted in the antenna port 5, 7, 8, 9, 10, 11, 12, 13 or 14 in the corresponding 2 PRBs.
- UE does not receive a PDSCH RB transmitted in the antenna port 7 to which distributed VRB resource allocation has been assigned.
- UE may skip the decoding of a transport block if it does not receive all of allocated PDSCH RBs. If the UE skips the decoding, a physical layer indicates that the transport block has not been successfully decoded for a higher layer.

In the case of the frame structure type 2,
- UE does not receive a PDSCH RB transmitted in the antenna port 5 even in any subframe in which the number of OFDM symbols for a PDCCH having a common CP is 4.
- If any one of 2 PRBs to which a VRB pair is mapped overlaps a frequency in which a PBCH is transmitted within the same subframe, UE does not receive a PDSCH RB transmitted in the antenna port 5 in the corresponding 2 PRBs.
- If any one of 2 PRBs to which a VRB pair is mapped overlaps a frequency in which a primary or secondary synchronous signal is transmitted within the same subframe, UE does not receive a PDSCH RB transmitted in the antenna port 7, 8, 9, 10, 11, 12, 13 or 14 in the corresponding 2 PRBs.
- If a common CP is configured, UE does not receive a PDSCH in the antenna port 5 in which distributed VRB resource allocation has been assigned within a special subframe in an uplink-downlink configuration #1 or #6.
- UE does not receive a PDSCH transmitted in the antenna port 7 to which distributed VRB resource allocation has been assigned.
- UE may skip the decoding of a transport block if it does not receive all of allocated PDSCH RBs. If the UE skips the decoding, a physical layer indicates that the transport block has not been successfully decoded for a higher layer.

If UE is configured by a higher layer so that it decodes a PDCCH with CRC scrambled by a C-RNTI, the UE decodes the PDCCH and a corresponding PDSCH according to each combination defined in Table 6 below. The PDSCH corresponding to the PDCCH(s) is scrambling-initialized by the C-RNTI.

If a CIF for a serving cell is configured in UE or UE is configured by a higher layer so that it decodes a PDCCH with CRC scrambled by a C-RNTI, the UE decodes the PDSCH of a serving cell indicated by a CIF value within the decoded PDCCH.

When UE of the transmission mode 3, 4, 8 or 9 receives DCI format 1A assignment, the UE assumes that PDSCH transmission is related to a transport block 1 and a transport block 2 is disabled.

If UE is set as the transmission mode 7, a UE-specific reference signal corresponding to a PDCCH(s) is scrambling-initialized by a C-RNTI.

If an extended CP is used in downlink, UE does not support the transmission mode 8.

If UE is set as the transmission mode 9, when the UE detects a PDCCH with CRC scrambled by a C-RNTI on which the DCI format 1A or 2C intended for the UE is carried, the UE decodes a corresponding PDSCH in a subframe indicated by a higher layer parameter "mbsfn-SubframeConfigList." However, the subframe configured by a higher layer to decode a PMCH or, the subframe configured by a higher layer to be part of a PRS occasion and the PRS occasion is configured only within an MBSFN subframe and the length of a CP used in a subframe #0 is a common CP is excluded.

Table 8 illustrates a PDCCH and PDSCH configured by a C-RNTI.

TABLE 8

| TRANSMISSION MODE | DCI FORMAT | SEARCH SPACE | METHOD FOR SENDING PDSCH CORRESPONDING TO PDCCH |
|---|---|---|---|
| Mode 1 | DCI format 1A | common and UE-specific by a C-RNTI | a single antenna port, a port 0 |
|  | DCI format 1 | UE-specific by a C-RNTI | a single antenna port, a port 0 |
| Mode 2 | DCI format 1A | common and UE-specific by a C-RNTI | transmit diversity |
|  | DCI format 1 | UE-specific by a C-RNTI | transmit diversity |
| Mode 3 | DCI format 1A | common and UE-specific by a C-RNTI | transmit diversity |
|  | DCI format 2A | UE-specific by a C-RNTI | large delay CDD or transmit diversity |
| Mode 4 | DCI format 1A | common and UE-specific by a C-RNTI | transmit diversity |
|  | DCI format 2 | UE-specific by a C-RNTI | closed-loop spatial multiplexing or transmit diversity |
| Mode 5 | DCI format 1A | common and UE-specific by a C-RNTI | transmit diversity |
|  | DCI format 1D | UE-specific by a C-RNTI | multi-user MIMO |
| Mode 6 | DCI format 1A | common and UE-specific by a C-RNTI | transmit diversity |
|  | DCI format 1B | UE-specific by a C-RNTI | closed-loop spatial multiplexing using a single transport layer |

TABLE 8-continued

| TRANS-MISSION MODE | DCI FORMAT | SEARCH SPACE | METHOD FOR SENDING PDSCH CORRESPONDING TO PDCCH |
|---|---|---|---|
| Mode 7 | DCI format 1A | common and UE-specific by a C-RNTI | If the number of PBCH antenna ports is 1, a single antenna port, a port 0 is used, and if not, transmit diversity |
| | DCI format 1 | UE-specific by a C-RNTI | Single antenna port, a port 5 |
| Mode 8 | DCI format 1A | common and UE-specific by a C-RNTI | If the number of PBCH antenna ports is 1, a single antenna port, a port 0 is used, and if not, transmit diversity |
| | DCI format 2B | UE-specific by a C-RNTI | dual layer transmission, ports 7 and 8 or a single antenna port, a port 7 or 8 |
| Mode 9 | DCI format 1A | common and UE-specific by a C-RNTI | Non-MBSFN subframe: if the number of PBCH antenna ports is 1, a single antenna port, a port 0 is used, and if not, transmit diversity MBSFN subframe: a single antenna port, a port 7 |
| | DCI format 2C | UE-specific by a C-RNTI | layer transmission up to a maximum of 8, ports 7-14 |

If UE is configured by a higher layer so that it decodes a PDCCH with CRC scrambled by an SPS C-RNTI, the UE decodes a PDCCH of a primary cell and a corresponding PDSCH of the primary cell according to each combination defined in Table 7 below. If a PDSCH is transmitted without a corresponding PDCCH, the same PDSCH-related configuration is applied. The PDSCH corresponding to the PDCCH and the PDSCH not having a PDCCH is scrambling-initialized by the SPS C-RNTI.

If UE is set as the transmission mode 7, a PDCCH(s) and a corresponding UE-specific reference signal is scrambling-initialized by an SPS C-RNTI.

If UE is set as the transmission mode 9, when the UE detects a PDCCH with CRC scrambled by an SPS C-RNTI on which the DCI format 1A or 2C intended for the UE is carried or a PDSCH configured without a PDCCH intended for the UE, the UE decodes a corresponding PDSCH in a subframe indicated by a higher layer parameter "mbsfn-SubframeConfigList." However, the subframe configured a higher layer to decode a PMCH or, the subframe configured by a higher layer to be part of a PRS occasion and the PRS occasion is configured only within an MBSFN subframe and the CP length used in a subframe #0 is a common CP is excluded.

Table 9 illustrates a PDCCH and PDSCH configured by an SPS C-RNTI.

TABLE 9

| TRANS-MISSION MODE | DCI FORMAT | SEARCH SPACE | METHOD FOR SENDING PDSCH CORRESPONDING TO PDCCH |
|---|---|---|---|
| Mode 1 | DCI format 1A | common and UE-specific by a C-RNTI | a single antenna port, a port 0 |
| | DCI format 1 | UE-specific by a C-RNTI | a single antenna port, a port 0 |
| Mode 2 | DCI format 1A | common and UE-specific by a C-RNTI | transmit diversity |
| | DCI format 1 | UE-specific by a C-RNTI | transmit diversity |
| Mode 3 | DCI format 1A | common and UE-specific by a C-RNTI | transmit diversity |
| | DCI format 2A | UE-specific by a C-RNTI | transmit diversity |
| Mode 4 | DCI format 1A | common and UE-specific by a C-RNTI | transmit diversity |
| | DCI format 2 | UE-specific by a C-RNTI | transmit diversity |
| Mode 5 | DCI format 1A | common and UE-specific by a C-RNTI | transmit diversity |
| Mode 6 | DCI format 1A | common and UE-specific by a C-RNTI | transmit diversity |
| Mode 7 | DCI format 1A | common and UE-specific by a C-RNTI | a single antenna port, a port 5 |
| | DCI format 1 | UE-specific by a C-RNTI | a single antenna port, a port 5 |
| Mode 8 | DCI format 1A | common and UE-specific by a C-RNTI | a single antenna port, a port 7 |
| | DCI format 2B | UE-specific by a C-RNTI | a single antenna port, a port 7 or 8 |
| Mode 9 | DCI format 1A | common and UE-specific by a C-RNTI | a single antenna port, a port 7 |
| | DCI format 2C | UE-specific by a C-RNTI | a single antenna port, a port 7 or 8 |

If UE is configured by a higher layer so that it decodes a PDCCH with CRC scrambled by a temporary C-RNTI and is configured to not decode a PDCCH with CRC scrambled by a C-RNTI, the UE decodes a PDCCH and a corresponding PDSCH according to a combination defined in Table 9. The PDSCH corresponding to the PDCCH(s) is scrambling-initialized by the temporary C-RNTI.

Table 10 illustrates a PDCCH and a PDSCH configured by a temporary C-RNTI.

TABLE 10

| DCI FORMAT | SEARCH SPACE | METHOD FOR SENDING PDSCH CORRESPONDING TO PDCCH |
|---|---|---|
| DCI format 1A | common and UE-specific by a temporary C-RNTI | If the number of PBCH antenna ports is 1, a single antenna port, a port 0 is used, and if not, transmit diversity |
| DCI format 1 | UE-specific by a temporary C-RNTI | If the number of PBCH antenna ports is 1, a single antenna port, a port 0 is used, and if not, transmit diversity |

Quasi Co-Located (QCL) Between Antenna Ports

Quasi co-located and quasi co-location (QC/QCL) may be defined as follows.

If two antenna ports have a QC/QCL relation (or subjected to QC/QCL), UE may assume that the large-scale property of a signal transferred through one antenna port may be inferred from a signal transferred through the other antenna port. In this case, the large-scale property includes one or more of Delay spread, Doppler spread, Frequency shift, Average received power, and Received timing.

Furthermore, the following may be defined. Assuming that two antenna ports have a QC/QCL relation (or subjected to QC/QCL), UE may assume that the large-scale property of a channel of which one symbol is transferred through one antenna port may be inferred from a wireless channel of which one symbol is transferred through the other antenna port. In this case, the large-scale property includes one or more of Delay spread, Doppler spread, Doppler shift, Average gain, and Average delay.

That is, if two antenna ports have a QC/QCL relation (or subjected to QC/QCL), it means that the large-scale property of a wireless channel from one antenna port is the same as the large-scale property of a wireless channel from the other antenna port. Assuming that a plurality of antenna ports in which an RS is transmitted is taken into consideration, if antenna ports on which two types of different RSs are transmitted have a QCL relation, the large-scale property of a wireless channel from one antenna port may be replaced with the large-scale property of a wireless channel from the other antenna port.

In this disclosure, the QC/QCL-related definitions are not distinguished. That is, the QC/QCL concept may comply with one of the definitions. In a similar other form, the QC/QCL concept definition may be changed in a form in which antenna ports having an established QC/QCL assumption may be assumed to be transmitted at the same location (i.e., co-location) (e.g., UE may assume antenna ports to be antenna ports transmitted at the same transmission point). The spirit of the present invention includes such similar modifications. In an embodiment of the present invention, the QC/QCL-related definitions are interchangeably used, for convenience of description.

In accordance with the concept of the QC/QCL, UE may not assume the same large-scale property between wireless channels from corresponding antenna ports with respect to non-QC/QCL antenna ports. That is, in this case, UE may perform independent processing on timing acquisition and tracking, frequency offset estimation and compensation, delay estimation, and Doppler estimation for each configured non-QC/QCL antenna port.

There are advantages in that UE may perform the following operations between antenna ports capable of an assuming QC/QCL:

With respect to the Delay spread and Doppler spread, UE may identically apply the results of a power-delay profile, Delay spread and Doppler spectrum, and Doppler spread estimation for a wireless channel from any one antenna port to a Wiener filter which is used upon channel estimation for a wireless channel from other antenna ports.

With respect to the Frequency shift and received timing, UE may perform time and frequency synchronization on any one antenna port and then apply the same synchronization to the demodulation of other antenna ports.

With respect to the Average received power, UE may average reference signal received power (RSRP) measurement for two or more antenna ports.

For example, if a DMRS antenna port for downlink data channel demodulation has been subjected to QC/QCL with the CRS antenna port of a serving cell, UE may apply the large-scale property of a wireless channel estimated from its own CRS antenna port upon channel estimation through the corresponding DMRS antenna port, in the same manner, thereby improving reception performance of a DMRS-based downlink data channel.

The reason for this is that an estimation value regarding a large-scale property may be more stably obtained from a CRS because the CRS is a reference signal that is broadcasted with relatively high density every subframe and in a full bandwidth. In contrast, a DMRS is transmitted in a UE-specific manner with respect to a specific scheduled RB, and the precoding matrix of a precoding resource block group (PRG) unit that is used by an eNB for transmission may be changed. Thus, a valid channel received by UE may be changed in a PRG unit. Accordingly, although a plurality of PRGs has been scheduled in the UE, performance deterioration may occur when the DMRS is used to estimate the large-scale property of a wireless channel over a wide band. Furthermore, a CSI-RS may also have a transmission cycle of several-several tens of ms, and each resource block has also low density of 1 resource element for each antenna port in average. Accordingly, the CSI-RS may experience performance deterioration if it is used to estimate the large-scale property of a wireless channel.

That is, UE may perform the detection/reception, channel estimation, and channel state report of a downlink reference signal through a QC/QCL assumption between antenna ports FDR (Full Duplex Radio) System As one of the main candidate technologies for the next system following the LTE-A, a full duplex radio (FDR) system which simultaneously performs signal transmission and reception operations through the same frequency band/resource is considered. Here, the FDR system refers to a system that supports simultaneous transmission and reception of signals using the same resource in one device.

In order to enable the FDR operation, basically, the FDR device (eNB or UE, for example) must have the ability to eliminate/mitigate the influence of self-interference, which is the interference between transmission and reception signals of the FDR device. Specifically, the eNB is required to have the ability to remove/mitigate interference by a DL signal transmitted by the eNB at the time of receiving a UL signal and the UE is required to have the ability to remove/mitigate interference by a UL signal transmitted by the UE at the time of receiving a DL signal.

Meanwhile, as larger communication capacity is required for communication devices, efficient utilization of a limited frequency band is becoming an increasingly important issue in the next wireless communication system. Accordingly, a cellular communication system such as an LTE system is considered to utilize an unlicensed band such as the 2.4 GHz band used by the existing Wi-Fi system or a newly introduced 5 GHz band for traffic off-loading.

Basically, the unlicensed band is based on a premise of a wireless communication scheme through competition between communication nodes. Therefore, each communication node is required to first check whether other communication nodes transmit signals by performing channel sensing before it transmits a signal. In other words, each communication node first determines whether an unlicensed band (or channel) is busy or idle through channel sensing and, when the unlicensed band is determined to be idle, each communication node transmits a signal. This channel sensing operation is referred to as clear channel assessment (CCA), and eNBs and UEs of the LTE system also have to perform CCA to prevent interference/collision between signals with other nodes in order to transmit signals through an unlicensed band (or 'LTE-U Band'). In this manner, when an eNB or a UE of the LTE system transmits a signal, other communication nodes included in the Wi-Fi system must also perform CCA not to cause interference.

Here, each communication node may determine an occupation/idle state of a channel based on a preset CCA threshold at the time of performing CCA.

In the Wi-Fi standard (for example, 802.11ac/ax, etc.), the CCA threshold is specified to be −62 dBm for a non Wi-Fi signal and −82 dBm for a Wi-Fi signal. If a signal other than Wi-Fi (for example, LTE signals) is detected/received with power greater than or equal to −62 dBm or if a Wi-Fi signal is detected/received with power greater than or equal to −82 dBm, an STA or an AP may not transmit a signal so as not to cause interference. Conversely, if the STA or AP does not detect/receive a signal equal to or higher than the CCA threshold for approximately 4 us (or longer), it may transmit a signal.

In this disclosure, a signal transmission/reception operation of an eNB and/or a UE to which an FDR system is introduced is proposed in a situation where signals are transmitted/received through a carrier of an unlicensed band in which exclusive use of a specific system is not guaranteed.

FIG. 11 is a diagram illustrating an eNB and a UE that transmit and receive signals in a licensed band and an unlicensed band according to an embodiment of the present invention.

Referring to FIG. 11, in a carrier aggregation (CA) situation of a licensed band (or an LTE-A band) and an unlicensed band, an eNB may send a signal to a UE or a UE may send a signal to an eNB. Here, it may be assumed that the UE is configured to perform wireless communication via a component carrier (CC) in each of the licensed band and the unlicensed band (i.e., via two CCs derived from each licensed band). Here, the carrier in the licensed band may be interpreted as a 'primary CC' (PCC or PCell) and the carrier in the unlicensed band may be interpreted as a 'secondary CC (SCC or SCell)'. In view of this, the system to which the scheme proposed in this disclosure is applied may be referred to as a "licensed-assisted access (LAA)" system.

However, the methods proposed in this disclosure are not necessarily limited to be applied to the LAA system. The present invention may be extendedly applied to a situation where a plurality of licensed bands and a plurality of unlicensed bands are used as a CA technique and may also be extendedly applied even to a case where signals are transmitted and received between the eNB and the UE only with an unlicensed band. In addition, the schemes proposed in this disclosure may also be extendedly applied to any other wireless communication systems, as well as to the 3GPP LTE system.

The eNB described in this disclosure is a term covering all the concepts of a base station, a remote radio head (RRH), a transmission point (TP), a reception point (RP), a relay, and the like, may be used in combination. Hereinafter, the proposed method based on the 3GPP LTE system will be described for convenience of explanation. However, the scope of the system to which the proposed scheme is applied may be extended to systems (for example, UTRA, etc.) other than the 3GPP LTE system.

FIG. 12 is a diagram illustrating an asynchronous dual link situation according to an embodiment of the present invention. Here, the asynchronous dual link situation refers to a situation where the eNB has the FDR function but the UE does not have the FDR function.

The situation of FIG. 12 may be interpreted as a "FDR eNB+non-FDR UE" scenario. The eNB may perform an FDR operation and simultaneously perform UL reception and DL transmission, and may be referred to as an 'FDR eNB'. In contrast, UE1 and UE2, as half duplex (HD) UEs, may be referred to as 'non-FDR UEs'.

In this situation, if the eNB transmits a UL grant for scheduling UL transmission to the UE1 in a specific system frame (SF) of # n (n is a natural number) SF (or n-th SF), the UE1 may start UL transmission at # n+k (k is a natural number) SF (for example, # n+4 SF) (or (n+4)-th SF).

However, here, if a UL transmission band of the UE1 is an unlicensed band in the LAA system described above, it is not guaranteed that the CCA determination of the UE1 is successful at the time point of # n+k SF. Here, the success of CCA determination refers to a case where a signal equal to or lower than a CCA threshold is detected as a result of performing CCA and a channel is determined to be idle. The UE1 may be able to perform UL transmission at the time point of # n+k SF only when CCA determination is successful, and if the CCA determination fails, the UE1 cannot perform UL transmission at the corresponding time point. As a result, the FDR operation in which the eNB transmits a DL grant to the UE2 at the same time when the UE1 performs UL transmission (or UL reception by the eNB from the UE1) at the time point of # n+k SF fails.

That is, for a stable FDR operation, UL transmission of the UE1 must be guaranteed at a specific time point. Therefore, hereinafter, a method for stably ensuring UL transmission of the UE1 for the success of the FDR operation is proposed. Also, hereinafter, for convenience of description, the operation of UEs and the eNB according to a transmission time point of an SF will be described.

1. Transmission time point of # n SF: Directive CCA and UL grant transmission for UE1

FIG. 13 is a diagram illustrating operations of UE1 and eNB at a transmission time point of # n SF according to an embodiment of the present invention.

Referring to FIG. 13, first, the eNB (or a Ucell) may transmit an UL grant to a UE1 (or HD UE1) through # n SF. Here, the eNB may perform a directional CCA in a direction toward a target UE1 before transmitting an UL grant. More specifically, although the eNB does not succeed in CCA determination regarding other directions, if strength of a signal detected by performing a CCA (i.e., a directive CCA) in a direction targeting the UE1 (i.e., direction toward UE1 from the eNB) is lower than a preset (CCA) threshold, the CCA determination may be considered successful. In this case, the eNB may be able to send a UL grant to the UE1, and UE1 may initiate UL transmission at # n+k SF (e.g., k=4) (as a response to the UL grant).

Here, if a UL transmission band of the UE1 is an unlicensed band used in the LAA system, or the like, it is required to stably secure/guarantee channel occupancy of the UE in the unlicensed band so that the UE1 may succeed in performing CCA determination at a time point # n+k (for example, k=4). That is, it is necessary to guarantee/ensure that the UE1 successfully starts UL transmission at the # n+k SF (for example, k=4). Therefore, in the present disclosure, it is proposed to define/configure the UE1 to transmit a specific reservation signal during a previous period of the time point of # n+k (for example, k=4) SF to thereby occupy an unlicensed band until before an actual UL transmission time point.

To this end, the UE1 may be provided with control signaling regarding whether to activate the reservation signal transmission function. In addition, UE capability information/signaling associated with, for example, whether UE1 is able to transmit a reservation signal, or the like, may be defined, and UE1 may inform the network about that in advance.

Details of the reservation signal transmission function of the UE1 will be described hereinafter with reference to FIG. 14

2. Transmission time points of # n+1 to 3 SFs: a special DL grant for the reservation signal transmitted by UE1 and other UEs transmitted by the eNB FIG. 14 is a diagram illustrating operations of UE1 and eNB at transmission time points of # n+1 to 3 SFs according to an embodiment of the present invention.

As previously described, UE1 may be defined/configured to transmit a specific reservation signal during a previous time interval so that it may successfully initiate UL transmissions at # n+k SF (for example, k=4). Here, the UE1 may occupy a neighboring channel for a specific period (i.e., from # n SF to # n+k SF) by transmitting the reservation signal in all directions.

The transmission format of the reservation signal may be defined/configured in advance so that the network may recognize the reservation signal. That is, the UE1 may be configured to transmit a certain undefined signal as a reservation signal only for channel reservation/occupancy purposes, but, in order to allow other UEs to recognize the reservation signal, the UE1 may transmit a reservation signal having a predefined signature (a random signature is also possible). To this end, specific parameters (e.g., scrambling seed values, etc.) associated with the reservation signal (or specific parameters used to distinguish the reservation signal) may be provided/configured in advance to other UEs.

Accordingly, another UE may detect the reservation signal transmitted from the UE1 and may remove (or cancel) it if necessary. More specifically, as shown in FIG. 14, the eNB may transmit to the other UE "special DL grant" indicating that the current reservation signal (of UE1) is being transmitted. Upon receiving the special DL grant, the UE may detect the reservation signal transmitted from the corresponding UE1 and remove (or cancel) it to minimize an influence of interference from the UE.

The special DL grant for this purpose may explicitly (e.g., n-bit indication) or implicitly indicate whether the reservation signal can be transmitted and/or whether the reservation signal having a predefined characteristic can be removed using a specific field of a DCI (hereinafter, referred to as a 'reservation signal indication field').

A case where reservation signal related information is explicitly indicated may include various embodiments.

As an example, when 2 bits are allocated for the reservation signal indication field in the DCI, different information may be indicated as follows according to configured values of the corresponding field '00': Another UE does not currently transmit reservation signal '01': Another UE is currently transmitting reservation signal having first signature '10': Another UE is currently transmitting reservation signal having second signature '11': Another UE is currently transmitting reservation signal having third signature Alternatively, the following information may be indicated according to configured values.

'00': Another UE does not currently transmit reservation signal

'01': Another UE is currently transmitting reservation signal having first signature '10': Another UE is currently transmitting reservation signal having second signature '11': Two UEs is currently transmitting reservation signal having first signature and reservation signal having second signature, respectively Here, the signatures applied to the reservation signals of each UE may be (previously) configured/provided through RRC signaling.

Another UE, scheduled in the form of the special DL grant, may remove an interference signal from a UE that transmits a reservation signal like the UE1, and thus, it may perform communication in a state in which the quality of a received signal is enhanced. At the same time, since the UE1 successfully occupies a channel, start of UL transmission may be stably ensured/guaranteed at a time point agreed with the eNB. The FDR operation may be performed as the eNB performs DL transmission to another UE at a time point of UL transmission agreed with the UE1, and details thereof will be described below with reference to FIG. 15.

3. Transmission time point of # n+4 SF: Performing (directive) CCA for UE2 and FDR TX/RX (RX from UE1 and TX to UE2) in eNB.

FIG. 15 is a diagram illustrating operations of the UE1 and the eNB at a transmission time point of # n+4 SF according to an embodiment of the present invention.

As described above, in a state where the UE1 occupies a UL transport channel (e.g., an unlicensed band) up to a time point of an # n+k (e.g., k=4) SF through transmission of a reservation signal, the eNB transmits DL grant to the UE2 (UE paired with the UE1) as an FDR target at the time point of # n+k (e.g., k=4) and receives a UL signal from the UE1, thus performing the FDR operation. That is, through the FDR operation, the eNB may transmit the DL signal to the UE2 and simultaneously receive the UL signal from the UE1 at a specific time point (time point of # n+4 SF in this embodiment). In this case, when the DL transport channel is an unlicensed band, the eNB should perform CCA before DL transmission like the case of UL grant transmission. Also, in this case, the eNB may perform directive CCA in the direction toward the target UE2 (i.e., the direction from the eNB to the UE 2), rather than general CCA (e.g., omnidirectional CCA). When CCA determination is successful, the aforementioned FDR operation is started/performed.

Regarding the proposed operation as described above, the following embodiments may be further applied.

First, in the operation of the above-described embodiments, the DL TX chain and the UL RX chain may be separately implemented in the eNB, and this type eNB implementation may be configured/restricted as requirements. Also, in order to allow the FDR simultaneous transmission and reception operations for the UE1 and the UE2 to be performed at the stage 3. (i.e., the transmission time point of # n+4 SF) described above, the eNB may configure a specific UE pair (e.g., UE1 and UE2 pair) suitable for FDR scheduling in advance.

Here, the UE pair may be determined/configured based on a predefined certain rule. For example, UEs located in different directions with respect to the eNB may be defined as one UE pair.

And/or, the eNB may also provide control information related to a signature (e.g., scrambling seed value information, transmission resource related information) of the reservation signal to be transmitted by the UE paired with each UE to the corresponding UEs in advance.

Also, in order to schedule the FDR operation with another UE pair during a period in which the UE1 transmits the reservation signal as in the above-described embodiment, the eNB may transmit an UL grant to a specific UEx included in another UE pair, and as a result, a time interval in which a reservation signal is transmitted from UEx may be separately configured/defined. In this manner, in case where the reservation signal transmission times of the UE1 and the UEx overlap, a series of operation options may be defined/configured as follows.

UEs capable of simultaneously transmitting a reservation signal may be configured/restricted such that orthogonality is satisfied between the simultaneously transmitted reservation signals (that is, the reservation signals can be orthogonal signals). That is, the eNB may provide an associated configuration (e.g., feature configuration of each reservation signal to satisfy orthogonality) so that the reservation signals transmitted simultaneously from each UE may satisfy orthogonality in time, frequency, space and/or code domains. For example, if code domain orthogonality is configured to be satisfied between simultaneously transmitted reservation signals, a scrambling seed parameter, or the like, may be provided to the UEs in advance.

Accordingly, when another UE removes (or cancels) the simultaneously transmitted reservation signals, each reservation signal may be removed (or canceled) separately.

Alternatively, the UEs capable of simultaneously transmitting the reservation signal may be configured/restricted so as to transmit the reservation signal having the same signature. This allows the corresponding reservation signals to be combined on a radio channel (in the form of a single frequency network (SFN)) and received by different UEs (e.g., by using the same scrambling ID to form the same waveform), so that the combined reservation signals may be removed (or canceled) at a time when another UE removes (or cancels) the reservation signal.

As described above, the embodiments/operations proposed in the present disclosure may be periodically limited in an operation period by a predefined/predetermined pattern. For example, by limiting the above-described reservation signal transmission operation to be performed at intervals of k ms (e.g., k=4) for each UE (however, reservation signal transmission start times are configured to be different), a problem that the reservation signals transmitted by UEs (that is, a problem of simultaneous transmission of reservation signals by UEs) may not arise. Such a k-ms period may be configured cell-specifically, or backhaul signaling for cooperation/negotiation related thereto may be defined between adjacent cells to enable inter-cell coordination.

FIG. 16 is a flowchart illustrating a method of supporting FDR of an eNB according to an embodiment of the present invention. In relation to the flowchart, the above-described embodiments and explanations may be similarly applied, and a redundant description will be omitted below.

First, the eNB may perform a first CCA for an unlicensed band (S1610). Here, the first CCA may be a directive CCA from the eNB toward a first UE.

Next, if it is detected that the unlicensed band is in an idle state as a result of performing the first CCA (that is, if strength of a detected signal is less than or equal to a predetermined CCA threshold), the eNB may transmit an UL grant for PUSCH transmission of the first UE (S1620).

Next, the eNB may receive the PUSCH from the first UE through the unlicensed band at a preset time after transmission of the UL grant and simultaneously transmit a DL acknowledgment for PDSCH transmission to a second UE (S1630). For example, if a UL grant transmission time corresponds to the transmission time of # n SF, the eNB may transmit the DL acknowledgment to the second UE upon receiving the PUSCH from the first terminal at the transmission time of # n+4.

In this case, in order to stably transmit the PUSCH at a preset time after receiving the UL grant, the first UE may transmit a first reservation signal for occupying the unlicensed band up to a predetermined time after receiving the UL grant, in the unlicensed band. The detailed embodiment and description of a transmission operation of the first reservation signal of the first UE are the same as described above with reference to FIGS. 13 to 15.

General Device to which Present Invention May be Applied

FIG. 17 is a block diagram of a wireless communication device according to an embodiment of the present invention.

Referring to FIG. 17, a wireless communication system includes a base station (BS) (or eNB) 1710 and a plurality of terminals (or UEs) 1720 located within coverage of the BS 1710.

The eNB 1710 includes a processor 1711, a memory 1712, and a radio frequency (RF) unit 1713. The processor 1711 implements functions, processes and/or methods proposed in FIGS. 1 through 16. Layers of radio interface protocols may be implemented by the processor 1711. The memory 1712 may be connected to the processor 1711 to store various types of information for driving the processor 1711. The RF unit 1713 may be connected to the processor 1711 to transmit and/or receive a wireless signal.

The UE1720 includes a processor 1721, a memory 1722, and a radio frequency (RF) unit 1723. The processor 1721 implements functions, processes and/or methods proposed in above-described embodiments. Layers of radio interface protocols may be implemented by the processor 1721. The memory 1722 may be connected to the processor 1721 to store various types of information for driving the processor 1721. The RF unit 1723 may be connected to the processor 1721 to transmit and/or receive a wireless signal.

The memory 1712 or 1722 may be present within or outside of the processor 1711 or 1721 and may be connected to the processor 1711 or 1721 through various well known units. Also, the eNB 1710 and/or the UE1720 may have a single antenna or multiple antennas.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

Various embodiments for performing the invention have been described in the best form for implementing the invention.

The method for assisting communication between UEs in a wireless communication system of the present invention has been described on the basis of the example applied to the 3GPP LTE/LTE-A system, but the present invention may also be applied to various wireless communication systems other than the 3GPP/LTE/LTE-A system.

The invention claimed is:

1. A method for transmitting and receiving a wireless signal of a base station in a wireless communication system, the method comprising:
performing a first clear channel assessment (CCA) regarding an unlicensed band;
transmitting, when an idle state of the unlicensed band is detected as a result of performing the first CCA, an uplink (UL) grant for transmission of a physical uplink shared channel (PUSCH) of a first user equipment (UE),
wherein the first UE is a UE transmitting a first reservation signal for occupying the unlicensed band for a preset time, after receiving the UL grant;
transmitting, to another UE, a downlink (DL) grant including information indicating whether to transmit the first reservation signal of the first UE; and
receiving the PUSCH from the first UE through the unlicensed band at the preset time after transmission of the UL grant and simultaneously transmitting a DL grant for transmission of a physical downlink shared channel (PDSCH) to a second UE.

2. The method of claim 1, further comprising:
receiving capability information of the first UE including transmission capability information of the first reservation signal of the first UE.

3. The method of claim 1, further comprising:
transmitting, to the first UE, control information indicating whether to activate transmission capability of the first reservation signal of the first UE.

4. The method of claim 1, wherein the first CCA is a directive CCA regarding the first UE.

5. The method of claim 4, further comprising:
performing a second CCA regarding the unlicensed band before transmitting the DL grant, and wherein the second CCA is a directive CCA regarding the second UE.

6. The method of claim 5, wherein the first and the second UEs are paired in advance on the basis of a direction to the base station.

7. The method of claim 1, further comprising:
transmitting, to the another UE, a parameter required for detecting the first reservation signal of the first UE.

8. The method of claim 7, wherein the first reservation signal of the first UE is detected and removed by other UEs on the basis of the parameter.

9. The method of claim 1, further comprising:
when a third reservation signal of a third UE, which is not paired with the first UE, is expected to be simultaneously transmitted with the first reservation signal as the UL grant regarding the third UE is transmitted before the preset time, providing configuration information regarding the third reservation signal to the third UE so that the third reservation signal can be transmitted in a state of maintaining orthogonality with respect to the first reservation signal.

10. The method of claim 1, further comprising:
when a third reservation signal of a third UE, which is not paired with the first UE, is anticipated to be simultaneously transmitted with the first reservation signal as the UL grant regarding the third UE is transmitted before the preset time, providing configuration information regarding the third reservation signal to the third UE so that the third reservation signal can be combined with the first reservation signal and transmitted.

11. The method of claim 1, wherein, when the UL grant is received through an n-th system frame (SF), the preset time corresponds to a transmission time of (n+4)-th SF.

12. A base station of a wireless communication system, the base station comprising:
a transmitter and receiver configured to transmit and receive a wireless signal; and
a processor configured to control the transmitter and receiver, wherein the processor is further configured to:
perform a first clear channel assessment (CCA) regarding an unlicensed band, transmit an uplink (UL) grant for transmission of a physical uplink shared channel (PUSCH) of a first user equipment (UE) when an idle state of the unlicensed band is detected as a result of performing the first CCA,
wherein the first UE is a UE transmitting a first reservation signal for occupying the unlicensed band for a preset time, after receiving the UL grant,
transmit, to another UE, a downlink (DL) grant including information indicating whether to transmit the first reservation signal of the first UE, and
receive the PUSCH from the first UE through the unlicensed band at the preset time after transmission of the UL grant and simultaneously transmit a DL grant for transmission of a physical downlink shared channel (PDSCH) to a second UE.

* * * * *